US012613418B2

(12) United States Patent
Islam et al.

(10) Patent No.: US 12,613,418 B2
(45) Date of Patent: Apr. 28, 2026

(54) DISPLAY DEVICES WITH BRIDGE EMITTERS AND SENSORS

(71) Applicant: Apple Inc., Cupertino, CA (US)

(72) Inventors: Nurul Islam, Mountain View, CA (US); Malcolm J Northcott, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 371 days.

(21) Appl. No.: 18/505,570

(22) Filed: Nov. 9, 2023

(65) Prior Publication Data

US 2024/0201499 A1 Jun. 20, 2024

Related U.S. Application Data

(60) Provisional application No. 63/433,295, filed on Dec. 16, 2022.

(51) Int. Cl.
*G02B 27/01* (2006.01)
*F21V 8/00* (2006.01)
*G03B 21/20* (2006.01)

(52) U.S. Cl.
CPC ........ *G02B 27/0172* (2013.01); *G02B 6/0011* (2013.01); *G02B 6/0016* (2013.01); *G02B 6/0031* (2013.01); *G02B 6/0033* (2013.01); *G02B 2027/0178* (2013.01); *G03B 21/2033* (2013.01)

(58) Field of Classification Search
None
See application file for complete search history.

(56) References Cited

U.S. PATENT DOCUMENTS

| | | | |
|---|---|---|---|
| 10,241,328 B2 | 3/2019 | Urey et al. | |
| 11,002,898 B2 | 5/2021 | Peng et al. | |
| 11,202,043 B1 * | 12/2021 | Elazhary | ............ G02B 27/0176 |
| 11,360,313 B1 | 6/2022 | Fernandez | |

(Continued)

FOREIGN PATENT DOCUMENTS

| | | |
|---|---|---|
| EP | 3722863 A1 | 10/2020 |
| WO | 2023196753 A1 | 10/2023 |

OTHER PUBLICATIONS

U.S. Appl. No. 18/326,976, filed May 31, 2023.

*Primary Examiner* — Jerry Rahll
(74) *Attorney, Agent, or Firm* — Treyz Law Group, P.C.; Michael H. Lyons

(57) ABSTRACT

An electronic device may include a first and second projectors, first, second, and third waveguides, light sources, and optical sensors. The sources may emit calibration light into the third waveguide, which splits the calibration light between the first and second waveguides. Couplers on the third waveguide may couple the calibration light out of the third waveguide and partial reflectors on the first and second waveguides may reflect the calibration light back towards the optical sensors as reflected light. The couplers may provide the reflected light to the sensors, which generate electrical signals using the reflected light. Control circuitry may compare the electrical signals between different sensor locations to identify relative angles between the first waveguide, the second waveguide, the first projector, and/or the second projector. The control circuitry may use the identified relative angles to adjust projector images to compensate for optical misalignments over time.

20 Claims, 11 Drawing Sheets

(56)        References Cited

U.S. PATENT DOCUMENTS

| | | | | |
|---|---|---|---|---|
| 11,604,310 | B2 | 3/2023 | Schowengerdt et al. | |
| 11,651,566 | B2 | 5/2023 | Schowengerdt et al. | |
| 11,815,781 | B2 | 11/2023 | Brown et al. | |
| 2014/0375681 | A1* | 12/2014 | Robbins ............... | G01B 11/272 |
| | | | | 345/633 |
| 2018/0074578 | A1* | 3/2018 | Robbins ................. | G06T 11/60 |
| 2018/0098056 | A1* | 4/2018 | Bohn ................... | G02B 27/017 |
| 2019/0317270 | A1 | 10/2019 | Tammela et al. | |
| 2020/0012090 | A1 | 1/2020 | Lapstun | |
| 2020/0018968 | A1* | 1/2020 | Edwin ................. | G02B 6/0015 |
| 2021/0096371 | A1* | 4/2021 | Tammela ........... | G02B 27/0101 |
| 2021/0157142 | A1 | 5/2021 | Scheller et al. | |
| 2021/0303851 | A1* | 9/2021 | Dodson ................. | G06V 20/20 |
| 2021/0405378 | A1 | 12/2021 | Choi et al. | |
| 2022/0365596 | A1 | 11/2022 | Mattila et al. | |

* cited by examiner

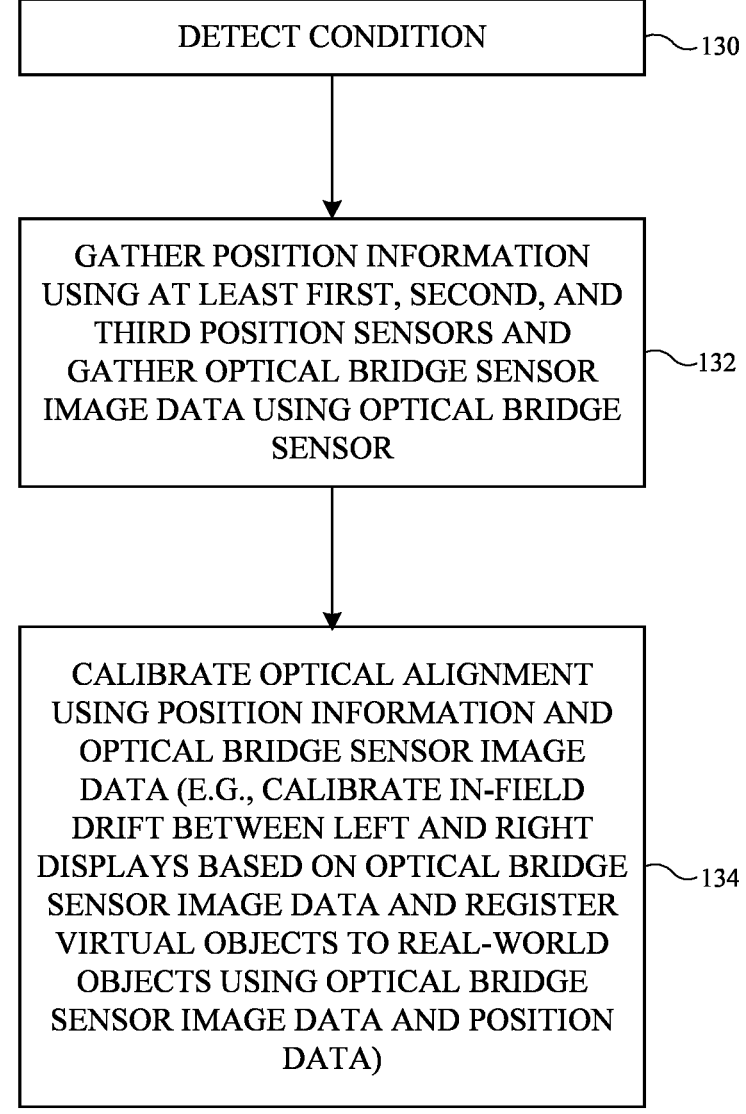

DETECT CONDITION ~130

GATHER POSITION INFORMATION USING AT LEAST FIRST, SECOND, AND THIRD POSITION SENSORS AND GATHER OPTICAL BRIDGE SENSOR IMAGE DATA USING OPTICAL BRIDGE SENSOR ~132

CALIBRATE OPTICAL ALIGNMENT USING POSITION INFORMATION AND OPTICAL BRIDGE SENSOR IMAGE DATA (E.G., CALIBRATE IN-FIELD DRIFT BETWEEN LEFT AND RIGHT DISPLAYS BASED ON OPTICAL BRIDGE SENSOR IMAGE DATA AND REGISTER VIRTUAL OBJECTS TO REAL-WORLD OBJECTS USING OPTICAL BRIDGE SENSOR IMAGE DATA AND POSITION DATA) ~134

*FIG. 8*

DISPLAY DEVICES WITH BRIDGE EMITTERS AND SENSORS

This application claims the benefit of U.S. Provisional Patent Application No. 63/433,295, filed Dec. 16, 2022, which is hereby incorporated by reference herein in its entirety.

FIELD

This relates generally to electronic devices, and, more particularly, to electronic devices such as head-mounted devices.

BACKGROUND

Electronic devices have components such as displays and other optical components. During operation, there is a risk that components may become misaligned with respect to each other due to drop events and other undesired high-stress events. This poses challenges for ensuring satisfactory component performance.

SUMMARY

A head-mounted device such as a pair of glasses may have a head-mounted housing. The head-mounted device may include displays such as projector displays and may include associated optical components. The housing may have a first portion, a second portion, and a nose bridge that couples the first portion to the second portion. A first display having a first projector and a first waveguide may be mounted in the first portion of the housing. A second display having a second projector and a second waveguide may be mounted in the second portion of the housing.

An optical bridge sensor may be disposed in the nose bridge and may couple the first waveguide to the second waveguide. The optical bridge sensor may include light sources such as vertical-cavity surface-emitting lasers (VC-SELs) and optical sensors such as photodiodes. The optical bridge sensor may also include a third waveguide. The light sources may emit calibration light into the third waveguide. The third waveguide may direct the calibration light towards the first and second waveguides. Optical couplers on the third waveguide may couple the calibration light out of the third waveguide and towards the first and second waveguides. Partial reflectors on the first and second waveguides may reflect the calibration light back towards the optical couplers as reflected light. If desired, additional partial reflectors may be disposed on the first and second waveguides overlapping the projectors and may reflect a portion of the calibration light that was transmitted into the first and second waveguides by the partial reflectors back towards the partial reflectors for inclusion in the reflected light.

The optical couplers and the third waveguide may provide the reflected light to the optical sensors. The optical sensors may generate electrical signals. Control circuitry may compare the electrical signals between different optical sensor locations to identify relative angles between the first waveguide, the second waveguide, the first projector, and/or the second projector. The control circuitry may use the identified relative angles to adjust image data provided to the projectors to compensate for misalignments between the first waveguide, the second waveguide, the first projector, and/or the second projector that may occur over time.

BRIEF DESCRIPTION OF THE DRAWINGS

FIG. 8 is a flow chart of illustrative operations involved in using a system to calibrate optical alignment in accordance with some embodiments.

DETAILED DESCRIPTION

A system may include one or more electronic devices. Each device may contain optical components and other components. During operation, the positions of these components and the devices may be monitored using position sensors. Using position information from the sensors and/or other sensor data, devices in the system may coordinate operation, may perform calibration operations to compensate for measured component misalignment, and/or may take other actions.

Figure 1:
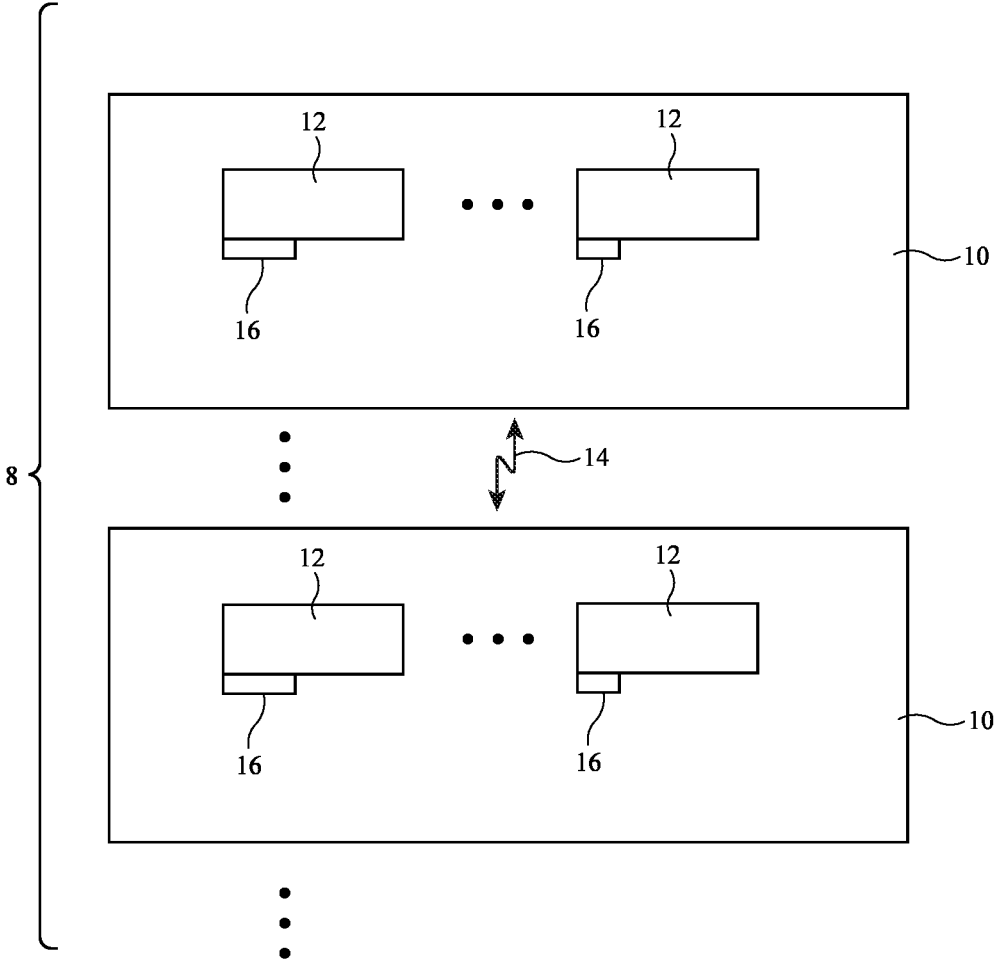
FIG. 1 is a diagram of an illustrative system in accordance with some embodiments.

FIG. 1 is a schematic diagram of an illustrative system of the type that may include one or more electronic devices with position sensors. As shown in FIG. 1, system 8 may include electronic devices 10. Devices 10 may include head-mounted devices (e.g., goggles, glasses, helmets, and/or other head-mounted devices), cellular telephones, tablet computers, peripheral devices such as headphones, game controllers, and/or other input devices. Devices 10 may, if desired, include laptop computers, computer monitors containing embedded computers, desktop computers, media players, or other handheld or portable electronic devices, smaller devices such as wristwatch devices, pendant devices, ear buds, or other wearable or miniature devices, televisions, computer displays that do not contain embedded computers, gaming devices, remote controls, embedded systems such as systems in which equipment is mounted in a kiosk, in an automobile, airplane, or other vehicle, removable external cases for electronic equipment, straps, wrist bands or head bands, removable covers for electronic devices, cases or bags that receive and carry electronic equipment and other items, necklaces or arm bands, wallets, sleeves, pockets, or other structures into which electronic equipment or other items may be inserted, part of an item of clothing or other wearable item (e.g., a hat, belt, wrist band, headband, sock, glove, shirt, pants, etc.), or equipment that implements the functionality of two or more of these devices.

With one illustrative configuration, which may sometimes be described herein as an example, system 8 includes a head-mounted device such as a pair of glasses (sometimes referred to as augmented reality glasses). System 8 may also include peripherals such as headphones, game controllers, and/or other input-output devices (as examples). In some scenarios, system 8 may include one or more stand-alone devices 10. In other scenarios, multiple devices 10 in system 8 exchange information using wired and/or wireless links, which allows these devices 10 to be used together. For example, a first of devices 10 may gather user input or other input that is used to control a second of devices 10 (e.g., the first device may be a controller for the second device). As another example, a first of devices 10 may gather input that is used in controlling a second device 10 that, in turn, displays content on a third device 10.

Devices 10 may include components 12. Components 12 may include control circuitry. The control circuitry may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in the control circuitry may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between devices 10 and/or to support communications between equipment in system 8 and external electronic equipment, devices 10 may include wired and/or wireless communications circuitry. The communications circuitry of devices 10, which may sometimes be referred to as control circuitry and/or control and communications circuitry, may include antennas, radio-frequency transceiver circuitry, and other wireless communications circuitry and/or wired communications circuitry. The communications circuitry of devices 10 may, for example, support bidirectional wireless communications between devices 10 over wireless links such as wireless link 14 (e.g., a wireless local area network link, a near-field communications link, or other suitable wired or wireless communications link (e.g., a Bluetooth® link, a WiFi® link, a 60 GHz link or other millimeter wave link, etc.). Components 12 may also include power circuits for transmitting and/or receiving wired and/or wireless power and may include batteries.

Components 12 may include input-output devices. The input-output devices may be used in gathering user input, in gathering information on the environment surrounding the user, and/or in providing a user with output. The input-output devices may include sensors such as force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors, and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or inertial measurement units that contain some or all of these sensors), radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, and/or other sensors. In some arrangements, devices 10 may use sensors and/or other input-output devices to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.).

Components 12 may include haptic output devices. The haptic output devices can produce motion that is sensed by the user (e.g., through the user's head, hands, or other body parts). Haptic output devices may include actuators such as electromagnetic actuators, motors, piezoelectric actuators, electroactive polymer actuators, vibrators, linear actuators, rotational actuators, actuators that bend bendable members, etc.

If desired, input-output devices in components 12 may include other devices such as displays (e.g., to display images for a user), status indicator lights (e.g., a light-emitting diode that serves as a power indicator, and other light-based output devices), speakers and other audio output devices, electromagnets, permanent magnets, structures formed from magnetic material (e.g., iron bars or other ferromagnetic members that are attracted to magnets such as electromagnets and/or permanent magnets), etc.

As shown in FIG. 1, sensors such as position sensors 16 may be mounted to one or more of components 12. Position sensors 16 may include accelerometers, magnetic sensors such as compass sensors, gyroscopes, and/or inertial measurement units (IMUs) that contain some or all of these sensors. Position sensors 16 may be used to measure location (e.g., location along X, Y, and Z axes), orientation (e.g., angular orientation around the X, Y, and Z axes), and/or motion (changes in location and/or orientation as a function of time). Sensors such as position sensors 16 that can measure location, orientation, and/or motion may sometimes be referred to herein as position sensors, motion sensors, and/or orientation sensors.

Devices 10 may use position sensors 16 to monitor the position (e.g., location, orientation, motion, etc.) of devices 10 in real time. This information may be used in controlling one or more devices 10 in system 8. As an example, a user may use a first of devices 10 as a controller. By changing the position of the first device, the user may control a second of devices 10 (or a third of devices 10 that operates in conjunction with a second of devices 10). As an example, a first device may be used as a game controller that supplies user commands to a second device that is displaying an interactive game.

Devices 10 may also use position sensors 16 to detect any changes in position of components 12 with respect to the housings and other structures of devices 10 and/or with respect to each other. For example, a given one of devices 10 may use a first position sensor 16 to measure the position of a first of components 12, may use a second position sensor 16 to measure the position of a second of components 12, and may use a third position sensor 16 to measure the position of a third of components 12. By comparing the measured positions of the first, second, and third components (and/or by using additional sensor data), device 10 can determine whether calibration operations should be performed, how calibration operations should be performed, and/or when/how other operations in device 10 should be performed.

Figure 2:
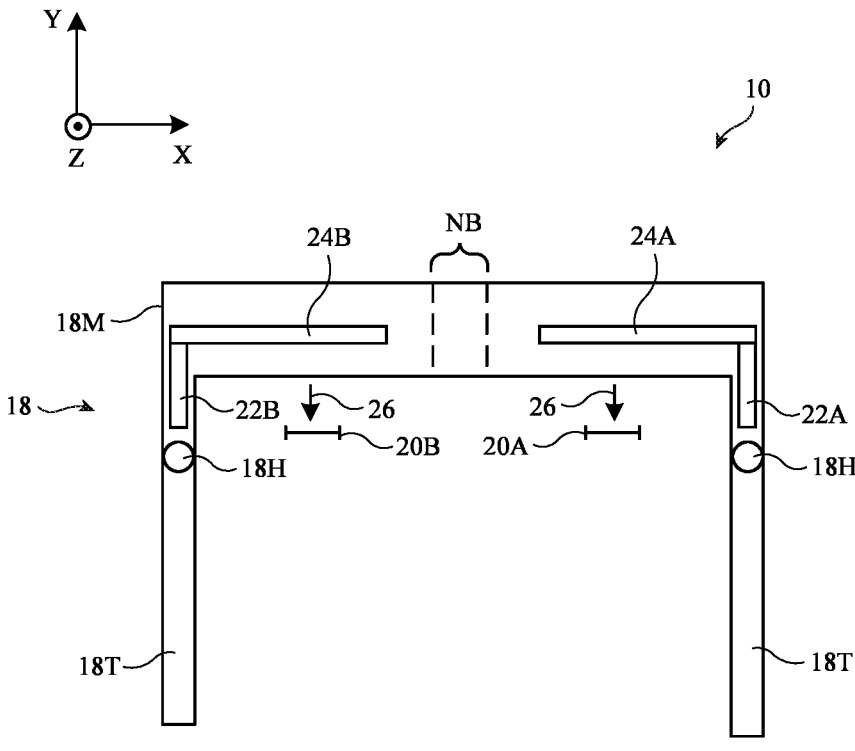
FIG. 2 is a top view of an illustrative head-mounted device in accordance with some embodiments.

In an illustrative configuration, devices 10 include a head-mounted device such as a pair of glasses (sometimes referred to as augmented reality glasses). A top view of device 10 in an illustrative configuration in which device 10 is a pair of glasses is shown in FIG. 2. A shown in FIG. 2, device 10 may include housing 18. Housing 18 may include a main portion (sometimes referred to as a glasses frame) such as main portion 18M and temples 18T that are coupled to main portion 18M by hinges 18H. Nose bridge portion NB may have a recess that allows housing 18 to rest on a nose of a user while temples 18T rest on the user's ears.

Images may be displayed in eye boxes 20 using displays 22 and waveguides 24. Displays 22 may sometimes be referred to herein as projectors 22, projector displays 22, display projectors 22, light projectors 22, image projectors 22, light engines 22, or display modules 22. Projector 22 may include a first projector 22B (sometimes referred to herein as left projector 22B) and a second projector 22A (sometimes referred to herein as right projector 22A). Projectors 22A and 22B may be mounted at opposing right and left edges of main portion 18M of housing 18, for example. Eye boxes 20 may include a first eye box 20B (sometimes referred to herein as left eye box 20B) and may include a second eye box 20A (sometimes referred to herein as right eye box 20A). Waveguides 24 may include a first waveguide 24B (sometimes referred to herein as left waveguide 24B) and a second waveguide 24A (sometimes referred to herein as right waveguide 24A). Main portion 18M of housing 18 may, for example, have a first portion that includes first projector 22B and first waveguide 24B and a second portion that includes second projector 22A and second waveguide 24A (e.g., where nose bridge NB separates the first and second portions such that the first portion is at a first side of the nose bridge and the second portion is at a second side of the nose bridge).

Waveguides 24 may each include one or more stacked substrates (e.g., stacked planar and/or curved layers sometimes referred to herein as waveguide substrates) of optically transparent material such as plastic, polymer, glass, etc. If desired, waveguides 24 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguides 24 may include holographic phase gratings such as volume holograms or thin-film holograms, meta-gratings, or any other desired diffractive grating structures. The diffractive gratings on waveguides 24 may also include surface relief gratings (SRGs) formed on one or more surfaces of the substrates in waveguides 24, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Waveguides 24 may have input couplers that receive light from projectors 22. This image light is then guided laterally (along the X axis) within waveguides 24 in accordance with the principal of total internal reflection. Each waveguide 24 may have an output coupler in front of a respective eye box 20. The output coupler couples the image light out of the waveguide 24 and directs an image towards the associated eye box 20 for viewing by a user (e.g., a user whose eyes are located in eye boxes 20), as shown by arrows 26. Input and output couplers for device 10 may be formed from diffractive gratings (e.g., surface relief gratings, volume holograms, etc.) and/or other optical structures.

For example, as shown in FIG. 2, first projector 22B may emit (e.g., produce, generate, project, or display) image light that is coupled into first waveguide 24B (e.g., by a first input coupler on first waveguide 24B). The image light may propagate in the +X direction along first waveguide 24B via total internal reflection. The output coupler on first waveguide 24B may couple the image light out of first waveguide 24B and towards first eye box 20B (e.g., for view by the user's left eye at first eye box 20B). Similarly, second projector 22A may emit (e.g., produce, generate, project, or display) image light that is coupled into second waveguide 24A (e.g., by a second input coupler on second waveguide 24A). The image light may propagate in the −X direction along second waveguide 24A via total internal reflection. The output coupler on second waveguide 24A may couple the image light out of second waveguide 24A and towards second eye box 20A (e.g., for view by the viewer's right eye at second eye box 20A).

Figure 3:
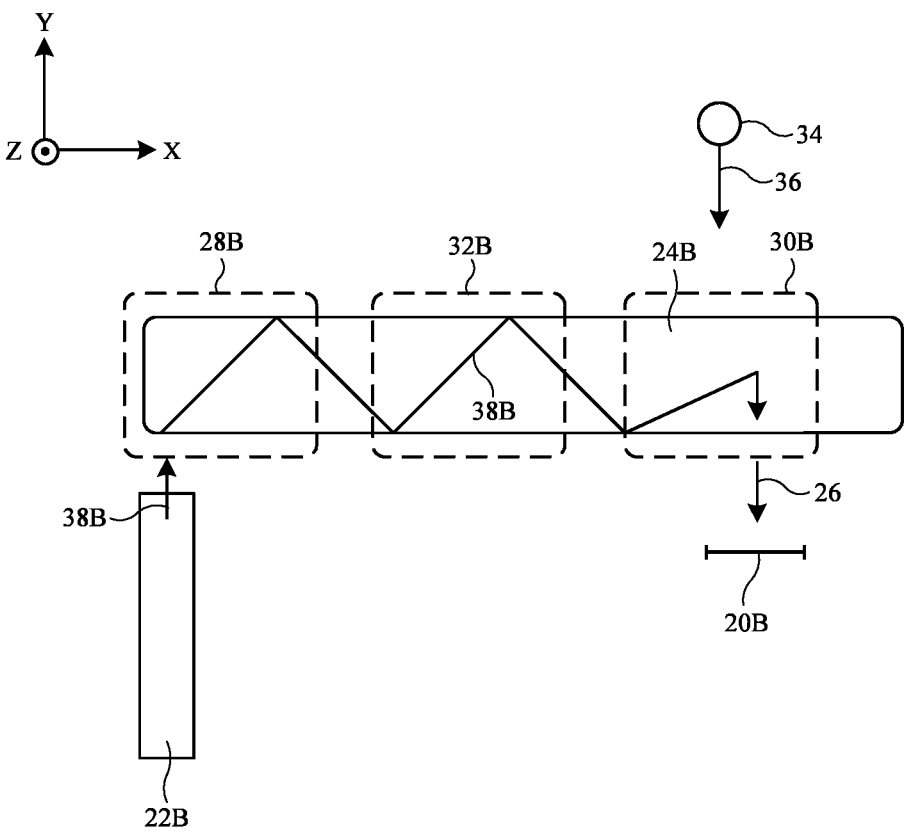
FIG. 3 is a top view of an illustrative display projector and waveguide for providing image light and world light to an eye box in accordance with some embodiments.

FIG. 3 is a top view showing how first waveguide 24B may provide light to first eye box 20B. As shown in FIG. 3, first projector 22B may emit image light 38B that is provided to first waveguide 24B. First projector 22B may include collimating optics (sometimes referred to as an eyepiece, eyepiece lens, or collimating lens) that help direct image light 38B towards first waveguide 24B. First projector 22B may generate image light 38B associated with image content to be displayed to (at) first eye box 20B. First projector 22B may include light sources that produce image light 38B (e.g., in scenarios where first projector 22B is an emissive display module, the light sources may include arrays of light emitters such as LEDs) or may include light sources that produce illumination light that is provided to a spatial light modulator first projector 22B. The spatial light modulator may modulate the illumination light with (using) image data (e.g., a series of image frames) to produce image light 38B (e.g., image light that includes images as identified by the image data). The spatial light modulator may be a transmissive spatial light modulator (e.g., may include a transmissive display panel such as a transmissive LCD panel) or a reflective spatial light modulator (e.g., may include a reflective display panel such as a DMD display panel, an LCOS display panel, an fLCOS display panel, etc.).

First waveguide 24B may be used to present image light 38B output from first projector 22B to first eye box 24B. First waveguide 24B may include one or more optical couplers such as input coupler 28B, cross-coupler 32B, and output coupler 30B. In the example of FIG. 3, input coupler 28B, cross-coupler 32B, and output coupler 30B are formed at or on first waveguide 24B. Input coupler 28B, cross-coupler 32B, and/or output coupler 30B may be completely embedded within the substrate layers of first waveguide 24B, may be partially embedded within the substrate layers of first waveguide 24B, may be mounted to first waveguide 24B (e.g., mounted to an exterior surface of first waveguide 24B), etc.

The example of FIG. 3 is merely illustrative. One or more of these couplers (e.g., cross-coupler 32B) may be omitted. First waveguide 24B may be replaced with multiple waveguides that are laterally and/or vertically stacked with respect to each other. Each of these waveguides may include one, two, all, or none of couplers 28B, 32B, and 30B. First waveguide 24B may be at least partially curved or bent if desired.

First waveguide 24B may guide image light 38B down its length via total internal reflection. Input coupler 28B may be configured to couple image light 38B into first waveguide 24B, whereas output coupler 30B may be configured to couple image light 38B from within waveguide 24B to the exterior of first waveguide 24B and towards first eye box 24B. Input coupler 28B may include an input coupling prism or a diffractive gratings such as an SRG or a set of volume holograms, as examples. As shown in FIG. 3, first projector 22B may emit image light 38B in the +Y direction towards first waveguide 24B. When image light 38B strikes input coupler 28B, input coupler 28B may redirect image light 38B so that the light propagates within first waveguide 24B via total internal reflection towards output coupler 30B (e.g., in the +X direction). When image light 38B strikes output coupler 30B, output coupler 30B may redirect image light 38B out of first waveguide 24B towards first eye box 24B (e.g., back in the −Y direction). In scenarios where cross-coupler 32B is formed at first waveguide 24B, cross-coupler 24B may redirect image light 38B in one or more directions as it propagates down the length of first waveguide 24B, for example.

Input coupler 28B, cross-coupler 32B, and/or output coupler 30B may be based on reflective and refractive optics or may be based on holographic (e.g., diffractive) optics. In arrangements where couplers 28B, 30B, and 32B are formed from reflective and refractive optics, couplers 28B, 30B, and 32B may include one or more reflectors (e.g., an array of micromirrors, partial mirrors, louvered mirrors, or other reflectors). In arrangements where couplers 2B8, 30B, and 32B are based on holographic optics, couplers 28B, 30B, and 32B may include diffractive gratings (e.g., volume holograms, surface relief gratings, etc.). Any desired combination of holographic and reflective optics may be used to form couplers 28B, 30B, and 32B. In one suitable arrangement that is sometimes described herein as an example, input coupler 28B, cross-coupler 32B, and output coupler 30B each include surface relief gratings (e.g., surface relief gratings formed by modulating the thickness of one or more layers of surface relief grating substrate in first waveguide 24B).

In an augmented reality configuration, first waveguide 24B may also transmit (pass) real-world light from the scene/environment in front of (facing) device 10. The real-world light (sometimes referred to herein as world light or environmental light) may include light emitted and/or reflected by objects in the scene/environment in front of device 10. For example, output coupler 30B may transmit world light 36 from real-world objects 34 in the scene/environment in front of device 10. Output coupler 30B may, for example, diffract image light 38B to couple image light 38B out of first waveguide 24B and towards first eye box 20B while transmitting world light 36 (e.g., without diffracting world light 36) to first eye box 20B. This may allow images in image light 38B to be overlaid with world light 36 of real-world objects 34 (e.g., to overlay virtual objects from image data in image light 38B as displayed by first projector 22B with real-world objects 34 in front of the user when viewed at first eye box 20A).

In the example of FIG. 3, only the waveguide and projector for providing image light to first eye box 20B is shown for the sake of clarity. Second waveguide 24A (FIG. 2) may include similar structures for providing light to second eye box 20A. During operation of device 10 (e.g., by an end user), mechanical stresses, thermal effects, and other stressors may alter the alignment between two or more components of device 10. For example, the optical alignment between the components of device 10 may change when the user places device 10 on their head, removes device 10 from their head, places device 10 on a surface or within a case, drops device 10 on the ground, when a mechanical impact event occurs at device 10, when device 10 enters different environments at different temperatures or humidities, when a user bends, stresses, or shakes one or more components in device 10, etc. If care is not taken, these changes in optical alignment can undesirably affect the images provided to eye boxes 20A and 20B (e.g., can produce visible misalignment at one or both eye boxes 20A and 20B). As these changes in optical alignment will vary by user and from system-to-system, it may be desirable to actively identify such changes in the field (e.g., during operation of device 10 by an end user rather than in-factory during the manufacture of device 10) so that suitable action can be taken to mitigate the identified changes to provide an optimal display experience for the user over time.

Figure 4:
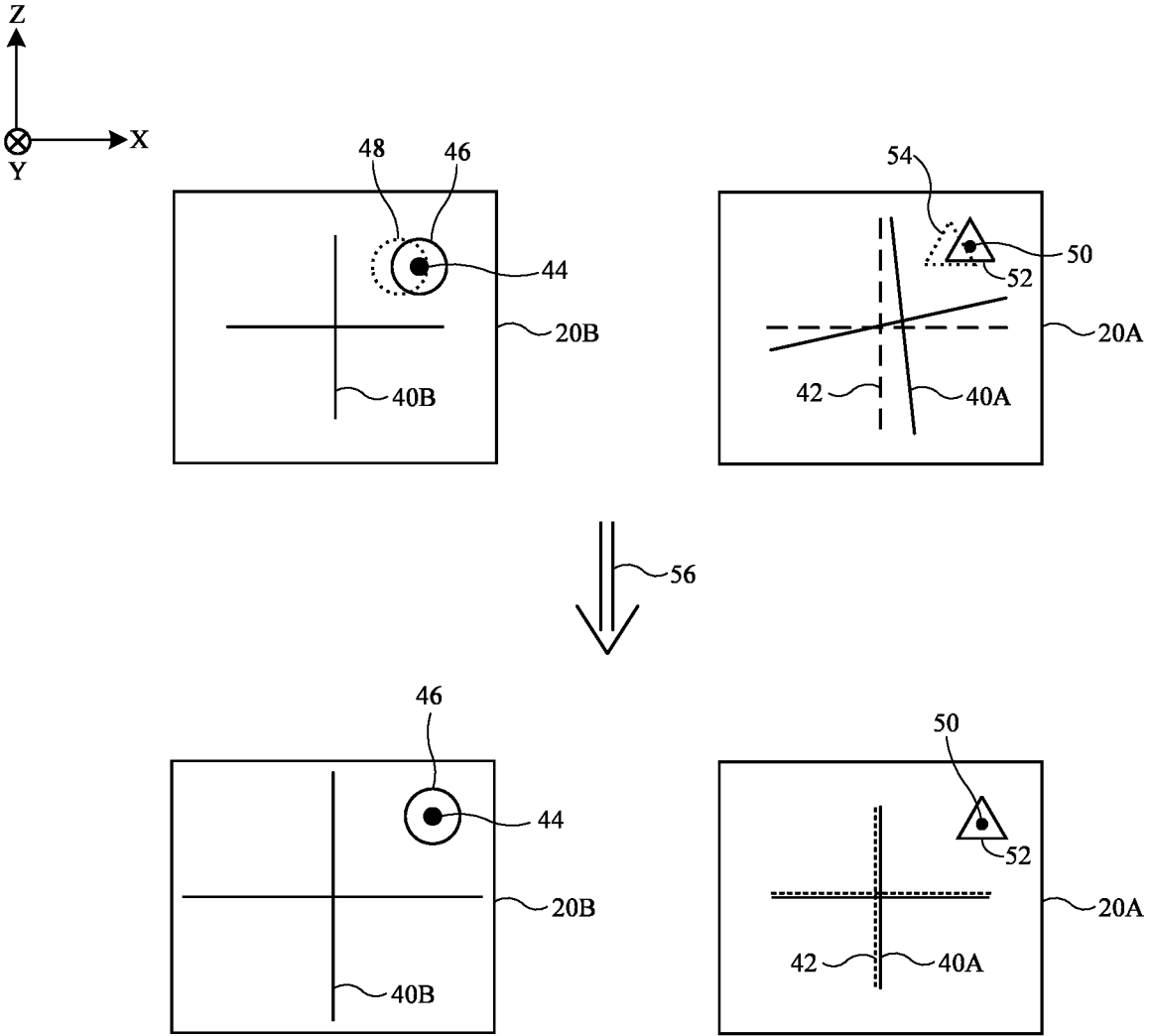
FIG. 4 is a diagram showing how an illustrative system may calibrate optical alignment in the image light provided to left and right eye boxes in accordance with some embodiments.

FIG. 4 is a diagram showing how device 10 may be calibrated to mitigate these changes in optical misalignment. As shown in FIG. 4, image data 40B (e.g., a left image) may be produced by first projector 22B and may be directed to first eye box 20B by first waveguide 24B. Image data 40A (e.g., a right image) may be produced by second projector 22A and may be directed to second eye box 20A by second waveguide 24A.

When first projector 22B and first waveguide 24B (e.g., the first display) are perfectly aligned with respect to second projector 22A and second waveguide 24A (the second display), image data 40A may be displayed at an ideal (nominal) location 42 within second eye box 20A (e.g., a location at which, when a user views eye boxes 20B and 20A with their respective left and right eyes, causes the image data to appear clearly and comfortably to the user given the user's binocular vision). In other words, nominal location 42 may be an expected location for image data 40A based on the binocular vision of the user.

However, when first projector 22B and/or first waveguide 24B become misaligned with respect to second projector 22A and/or second waveguide 24B, image data 40A may be received at second eye box 20A at a location other than nominal location 42, as shown in FIG. 4. This misalignment may present itself as a left-right binocular misalignment, causing virtual objects in image data 40A and/or 40B to appear blurry or misaligned between the eye boxes, or otherwise causing user discomfort when viewing both eye boxes 20A and 20B simultaneously. This left-right binocular misalignment may sometimes also be referred to herein as in-field drift (e.g., where virtual objects in one of the eye boxes drifts within the field of view from a nominal location due to misalignment between the left and right displays). In-field drift or other optical distortions may also be produced by misalignment or changes in alignment between first waveguide 24B and first projector 22B and misalignment between second waveguide 24A and second projector 22A.

If desired, the virtual objects in the image data provided to eye boxes 20A and 20B may be registered to one or more real-world objects 34 in world light 36 (FIG. 3). Real-world object registration involves the use of image sensors such as one or more outward-facing cameras (OFCs) on device 10. The OFCs may capture images of world light 36 to identify the presence of one or more real-world objects in the scene/environment in view of the system. One or more virtual objects in the image data provided to eye boxes 20A and 20B may be placed within the field of view at selected location(s) relative to one or more features or points on the one or more virtual objects detected using the OFCs.

For example, as shown in FIG. 4, a real-world object 44 may be present in the field of view of first eye box 20B and a real-world object 50 may be present in the field of view of second eye box 20A. The image data provided by image light 38B to first eye box 20B may include a virtual object 46 that is registered to real-world object 44 (e.g., such that the virtual object aligns with the real-world object within the field of view of first eye box 20B, overlaps with the real-world object within the field of view of first eye box 20B, is pinned to the real-world object within the field of view of first eye box 20B, tracks the real-world object within the field of view of first eye box 20B, etc.). Similarly, the image data provided by image light 38A to second eye box 20A may include a virtual object 52 that is registered to real-world object 50 (e.g., such that the virtual object aligns with the real-world object within the field of view of second eye box 20A, overlaps with the real-world object within the field of view of second eye box 20A, is pinned to the real-world object within the field of view of second eye box 20A, tracks the real-world object within the field of view of second eye box 20A, etc.). The image data provided to eye boxes 20B and 20A may include the same virtual object(s) provided at different locations between the eye boxes to accommodate binocular viewing of the virtual objects within the eye boxes, for example.

When one or more of the OFCs becomes misaligned with respect to one or more of first projector 22B, first waveguide 24B, second projector 22A, and/or second waveguide 24A (e.g., with respect to the first and/or second display), this may cause the virtual objects in the image data of one or both eye boxes to become misaligned with the real-world objects that the virtual objects are registered to. For example, virtual object 46 in first eye box 20B may become misaligned with respect to real-world object 44, such as at location 48, and/or virtual object 52 in second eye box 20A may become misaligned with respect to real-world object 50, such as at location 54.

Device 10 may perform in-field calibration operations using a set of sensors. In performing in-field calibration operations, the set of sensors may gather (e.g., measure, sense, or generate) sensor data that identifies the amount of optical misalignment in device 10. Control circuitry in device 10 may then perform adjustments to device 10 based on the identified amount of optical misalignment (e.g., to mitigate the identified amount of optical misalignment). The adjustments may include digital adjustments to the image data provided to projectors 22A and/or 22B for display at the eye boxes (e.g., to the image light 38A and/or 38B) such as digital translations, transformations, warping, distortion, or rotations to the image data and/or may include mechanical adjustments to projector 22A (or one or more components therein), projector 22B (or one or more components therein), second waveguide 24A, and/or first waveguide 24B (e.g., using actuators, microelectromechanical systems (MEMs) components, piezoelectric components, etc.). Performing in-field calibration operations in this way may allow device 10 to continue to exhibit proper optical alignment and thereby optimal display performance regardless of how the amount and type of optical misalignment present changes over time (e.g., due to mechanical stress effects and thermal effects on the system, how different users handle and operate the system, etc.).

The in-field calibration operations may serve to mitigate (e.g., calibrate, compensate for, or correct) optical misalignment that may be present in device 10, as shown by arrow 56. Such calibration may, for example, compensate for left-right binocular misalignment between the left and right displays (e.g., aligning image data 40A in second eye box 20A with nominal location 42) and/or may allow for proper registration of virtual objects with real-world objects (e.g., by properly registering virtual object 44 to real-world object 46, by properly registering virtual object 52 to real-world object 50, etc.).

Figure 5:
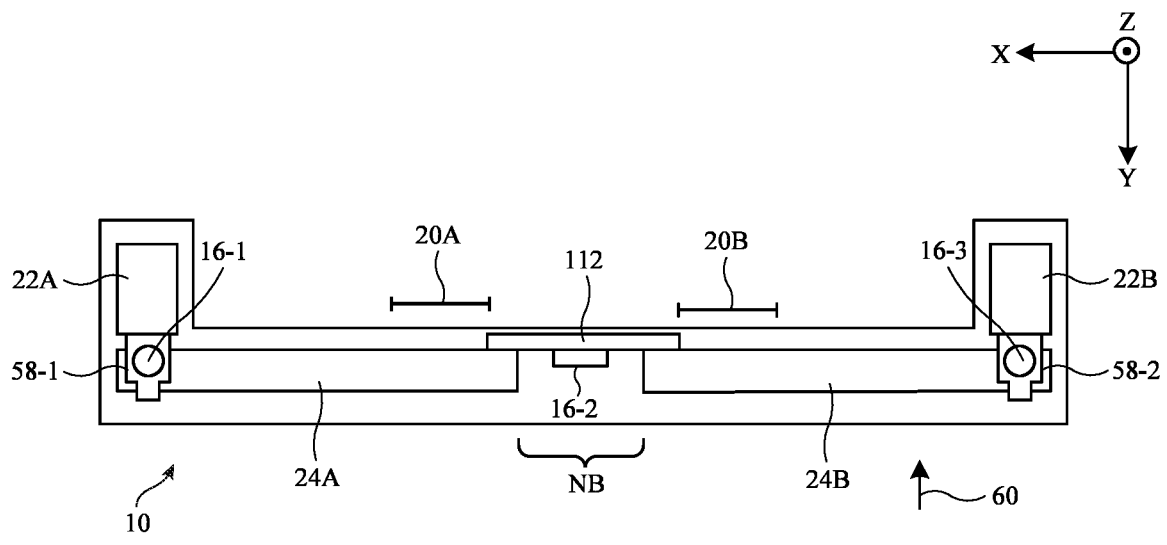
FIG. 5 is a top view of an illustrative head-mounted device having a left position sensor, a right position sensor, a bridge position sensor, and an optical bridge sensor for calibrating optical alignment in accordance with some embodiments.

The set of sensors used to perform in-field calibration operations in device 10 may include at least first, second, and third positional sensors and an optical bridge sensor. FIG. 5 is a cross-sectional top view of the main portion 18M of housing 18 (FIG. 2) showing how device 10 may include at least first, second, and third positional sensors and an optical bridge sensor.

As shown in FIG. 5, first projector 22B may be optically coupled to a first (left) edge of first waveguide 24B (e.g., a temple side/edge of the first waveguide). First waveguide 24B may propagate image light (e.g., image light 38B of FIG. 3) from first projector 22B towards its opposing second (right) edge (e.g., a nose bridge side/edge of the first waveguide). An output coupler (e.g., output coupler 30B of FIG. 5) may be located at or adjacent to the second edge of first waveguide 24B. The output coupler may couple the image light out of first waveguide 24B and may direct the image light towards first eye box 20B. If desired, one or more lens elements (not shown) may help to direct the image light coupled out of first waveguide 24B towards first eye box 20B.

Similarly, second projector 22A may be optically coupled to a first (right) edge of second waveguide 24A (e.g., a temple side/edge of the second waveguide). Second waveguide 24A may propagate image light from first projector 22A towards its opposing second (left) edge (e.g., a nose bridge side/edge of the second waveguide). An output coupler may be located at or adjacent to the second edge of second waveguide 24A. The output coupler may couple the image light out of second waveguide 24A and may direct the image light towards second eye box 20A. If desired, one or more lens elements (not shown) may help to direct the image light coupled out of second waveguide 24A towards second eye box 20A.

As shown in FIG. 5, an optical sensor such as optical bridge sensor 112 may be disposed within nose bridge NB of main portion 18M of the housing. Optical bridge sensor 112 may be coupled to the second edge of first waveguide 24B and may be coupled to the second edge of second waveguide 24A (e.g., optical bridge sensor 112 may bridge nose bridge NB). First waveguide 24B may include an additional output coupler at the second edge of first waveguide 24B. The additional output coupler may couple some of the image light propagating through first waveguide 24B out of first waveguide 24B and into optical bridge sensor 112. Similarly, second waveguide 24A may include an additional output coupler at the second edge of second waveguide 24A. The additional output coupler may couple some of the image light propagating through second waveguide 24A out of second waveguide 24A and into optical bridge sensor 112. Optical bridge sensor 112 may include one or more image sensors that gathers image sensor data (sometimes referred to herein as optical bridge sensor image data) from the image light coupled out of waveguides 24A and 24B. The optical bridge sensor image data may be a real-time representation of the image data that is actually being provided to eye boxes 20A and 20B after propagating from the projectors 22 and through the waveguides 24. The optical bridge sensor image data may therefore allow for real-time measurement of any optical misalignment between the left and right displays in device 10.

Device 10 may also include at least two outward facing cameras 58 such as a first OFC 58-1 and a second OFC 58-2. OFCs 58-1 and 58-2 may capture images of world light 36 (FIG. 3). The captured images may be used to help to identify how device 10 is oriented relative to its environment and surroundings. The captured images may also be used to register real-world objects in the environment to virtual objects in the image data conveyed to eye boxes 20A and 20B (e.g., as shown in FIG. 4). OFCs 58-1 and 58-2 may be disposed at opposing sides of main portion 18M of the housing for device 10 to allow the captured images to be used for binocular vision and three-dimensional depth perception of the environment. For example, as shown in FIG. 5, OFC 58-1 may be disposed at the left side of device 10 and may overlap first projector 22B and/or the first edge of first waveguide 24B. Similarly, OFC 58-2 may be disposed at the right side of device 10 and may overlap second projector 22A and/or the first edge of second waveguide 24A. In other words, OFC 58-2, first projector 22B, and first waveguide 24B may be disposed in a first portion of housing 18, OFC 58-1, second projector 22A, and second waveguide 24A may be disposed in a second portion of housing 18, and nose bridge NB may couple the first portion of housing 18 to the second portion of housing 18.

As shown in FIG. 5, device 10 may include at least three position sensors 16 such as position sensors 16-1, 16-2, and 16-3. Position sensors 16-1, 16-2, and 16-3 may be IMUs, for example. Position sensor 16-3 may be disposed (mounted) at OFC 58-2 and may therefore sometimes be referred to herein as left position sensor 16-3. For example, position sensor 16-3 may be disposed on OFC 58-2 (e.g., on a frame, bracket, or housing of OFC 58-2), may be integrated within OFC 58-2 (e.g., within a frame, bracket, or housing of OFC 58-2), may be adhered or affixed to OFC 58-2 (e.g., using adhesive, screws, springs, pins, clips, solder, etc.), and/or may be disposed on a substrate (e.g., a rigid or flexible printed circuit board) that is layered onto or within OFC 58-2. In general, it may be desirable for position sensor 16-3 to be as tightly coupled to OFC 58-2 as possible so that position/orientation changes measured by position sensor 16-3 are accurate measurements of position/orientation changes of OFC 58-2.

Position sensor 16-1 may be disposed (mounted) at OFC 58-1 and may therefore sometimes be referred to herein as right position sensor 16-1. For example, position sensor 16-1 may be disposed on OFC 58-1 (e.g., on a frame, bracket, or housing of OFC 58-1), may be integrated within OFC 58-1 (e.g., within a frame, bracket, or housing of OFC 58-1), may be adhered or affixed to OFC 58-1 (e.g., using adhesive, screws, springs, pins, clips, solder, etc.), and/or may be disposed on a substrate (e.g., a rigid or flexible printed circuit board) that is layered onto or within OFC 58-1. In general, it may be desirable for position sensor 16-1 to be as tightly coupled to OFC 58-1 as possible so that position/orientation changes measured by position sensor 16-1 are accurate measurements of position/orientation changes of OFC 58-1.

Position sensor 16-2 may be disposed (mounted) at optical bridge sensor 112 and may therefore sometimes be referred to herein as central position sensor 16-2, bridge position sensor 16-2, or optical bridge sensor position sensor 16-2. For example, position sensor 16-2 may be disposed on optical bridge sensor 112 (e.g., on a frame, bracket, or housing of optical bridge sensor 112), may be integrated within optical bridge sensor 112 (e.g., within a frame, bracket, or housing of OFC 58-1), may be adhered or affixed to optical bridge sensor 112 (e.g., using adhesive, screws, springs, pins, clips, solder, etc.), and/or may be disposed on a substrate (e.g., a rigid or flexible printed circuit board) that is layered onto or within optical bridge sensor 112. In general, it may be desirable for position sensor 16-2 to be as tightly coupled to optical bridge sensor 112 as possible so that position/orientation changes measured by position sensor 16-2 are accurate measurements of position/orientation changes of optical bridge sensor 112.

The example of FIG. 5 is merely illustrative. Position sensors 16-1, 16-2, and 16-3 may be disposed at other locations. OFC 58-1 and OFC 58-2 may be disposed at other locations. Additional OFCs 58 may be disposed in main portion of the housing of device 10 or elsewhere on device 10. The additional OFCs may include respective position sensors 16 if desired. Device 10 may include more than three position sensors 16. If desired, one or more non-visible light image sources and image sensors (e.g., infrared emitters and infrared image sensors) may be disposed within device 10 (e.g., on, within, or adjacent to projector 22A, projector 22B, second waveguide 24A, and/or first waveguide 24B) for tracking the direction of a user's gaze within eye boxes 20A and 20B. The infrared light sources and/or infrared light emitters may include position sensors for measuring their position/orientation if desired (e.g., for performing optical alignment calibration for gaze tracking using the systems and methods described herein).

Figure 6:
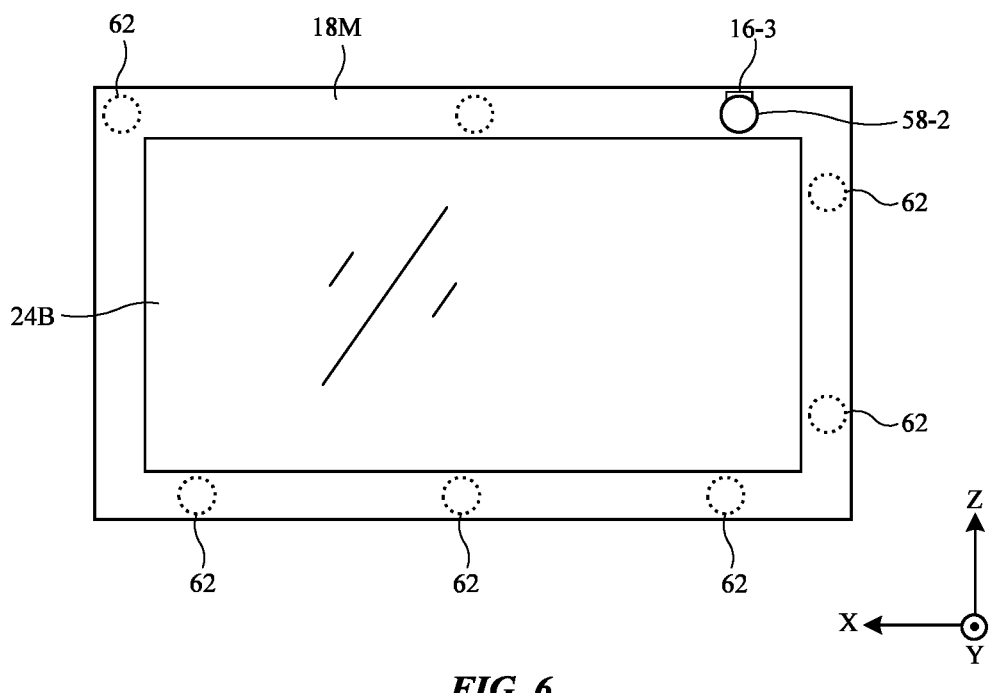
FIG. 6 is a front view showing how an illustrative position sensor and outward-facing camera may be mounted at different locations around the periphery of a waveguide in accordance with some embodiments.

FIG. 6 is a front view of first waveguide 24B (e.g., as viewed in the direction of arrow 60 of FIG. 5). As shown in FIG. 6, first waveguide 24B may be mounted within main portion 18M of the housing for device 10. First waveguide 24B may have a lateral surface in the X-Z plane of the page. The lateral surface of first waveguide 24B may have a periphery. In the example of FIG. 6, OFC 58-2 and its position sensor 16-3 are disposed at the top-right corner of the periphery of first waveguide 24B. This is merely illustrative and, in general, OFC 58-2 and position sensor 16-3 may be disposed at other locations around the periphery of first waveguide 24B, such as at any of locations 62. More than one OFC and position sensor may be disposed around the periphery of first waveguide 24B if desired.

Figure 7:
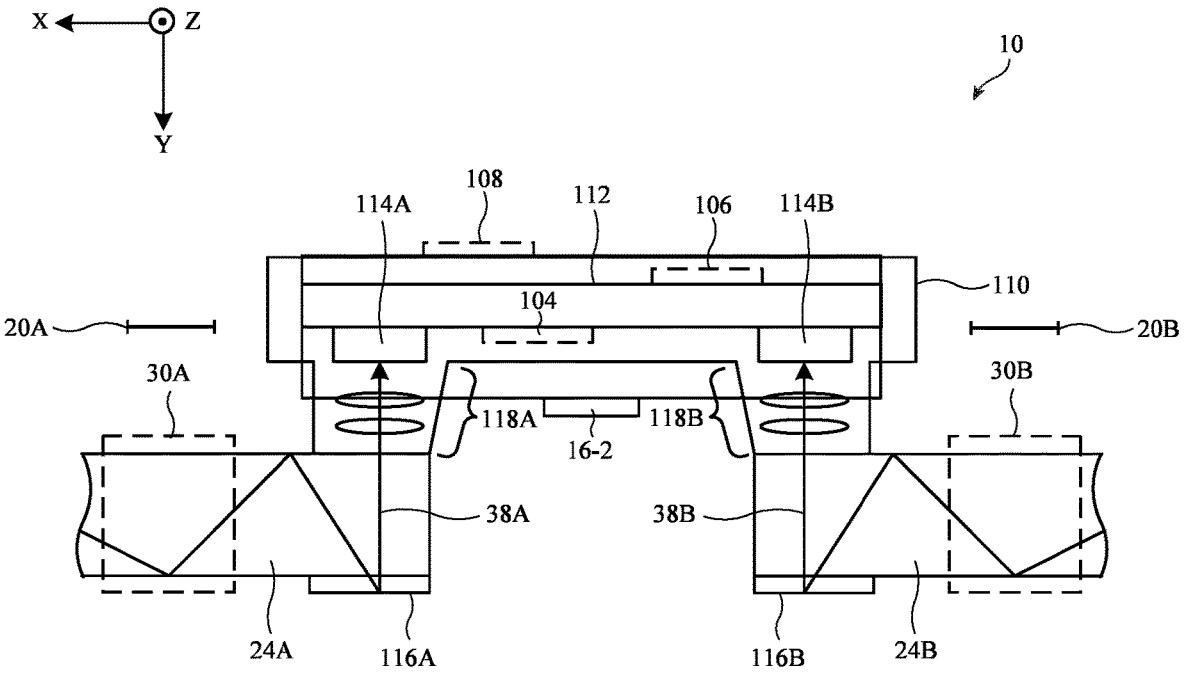
FIG. 7 is a cross-sectional top view of an illustrative optical bridge sensor and bridge position sensor in accordance with some embodiments.

FIG. 7 is a cross-sectional top view of optical bridge sensor 112 and its corresponding position sensor 16-2. Optical bridge sensor 112 may sometimes also be referred to as an optical misalignment detection sensor, an optical alignment sensor, or an optical misalignment detection module. As shown in FIG. 7, optical bridge sensor 112 may be integrated within a sensor housing 110. Sensor housing 110 may be formed from a part of main portion 18M of housing 18 within nose bridge NB (FIG. 1), may be a separate housing enclosed within nose bridge NB of main portion 18M, may be a frame or bracket that supports housing portion 18M, or may be omitted. Optical bridge sensor 112 (e.g., sensor housing 110) may have a first end mounted to first waveguide 24B and may have an opposing second end mounted to second waveguide 24A (e.g., using optically clear adhesive or other mounting structures).

First waveguide 24B may receive image light 38B from first projector 22B. Second waveguide 24A may receive image light 38A from second projector 22A. First waveguide 24B may have an output coupler 30B that couples a first portion of image light 38B out of the waveguide and towards first eye box 20A. Output coupler 30B may pass a second portion of image light 38B without coupling or diffracting the second portion of image light 38B out of first waveguide 24B. First waveguide 24B may include an additional output coupler 116B (e.g., a set of diffractive gratings such as a surface relief grating or volume holograms, louvered mirrors, an output coupling prism, etc.). Output coupler 116B may couple the second portion of image light 38B out of first waveguide 24B and into optical bridge sensor 112.

Similarly, second waveguide 24A may have an output coupler 30A that couples a first portion of image light 38A out of the waveguide and towards second eye box 20A. Output coupler 30A may pass a second portion of image light 38A without coupling or diffracting the second portion of image light 38A out of second waveguide 24A. Second waveguide 24A may include an additional output coupler 116A (e.g., a set of diffractive gratings such as a surface relief grating or volume holograms, louvered mirrors, an output coupling prism, etc.). Output coupler 116A may couple the second portion of image light 38A out of second waveguide 24A and into optical bridge sensor 112.

Optical bridge sensor 112 may have a first optical sensor 114A and a second optical sensor 114B (e.g., CMOS image sensors, quad cell image sensors, other types of image sensors or cameras, etc.). Optical sensors 114A an 114B may sometimes be referred to herein as image sensors 114A and 114B. If desired, optical bridge sensor 112 may include lens elements 118A that direct the second portion of the image light 38A from output coupler 116A towards image sensor 114A. If desired, optical bridge sensor 112 may also include lens elements 118B that direct the second portion of the image light 38B from output coupler 116B towards image sensor 114B. Image sensors 114A and 114B may gather image sensor data (optical sensor data such as optical bridge sensor image data) from image light 38A and 38B. Control circuitry in device 10 may process the optical bridge sensor image data for use in in-field optical alignment calibration operations. As one example, a specific pixel in projectors 22A/22B may be illuminated. The resultant image on image sensors 114A and 114B may then be used to compute relative misalignment between the left and right eye boxes. Relative clocking measurements may be made via multiple pixels.

Position sensor 16-2 may be mounted at any desired location on or in optical bridge sensor 112. For example position sensor 16-2 may be disposed on optical bridge sensor 112 within sensor housing 110 (e.g., at location 106 facing inwards or location 104 facing outwards) or may be disposed on sensor housing 110 (e.g., at a location facing outwards or at location 108 facing inwards). Position sensor 16-2 may be secured to optical bridge sensor 112 and/or sensor housing 110 using adhesive, screws, springs, pins, clips, solder, etc. If desired, position sensor 16-2 may be formed or mounted to a substrate such as a rigid or flexible printed circuit that is layered onto optical bridge sensor 112 within sensor housing 110 or that is layered onto sensor housing 110.

In the example of FIG. 7, optical bridge sensor 112 includes two image sensors for capturing optical bridge sensor image data from the first and second waveguides respectively. This is merely illustrative. In another suitable arrangement, optical bridge sensor 112 may include a single image sensor for capturing optical bridge sensor image data from both the first and second waveguides.

FIG. 8 is a flow chart of illustrative operations that may be performed by device 10 to perform in-field calibration using optical bridge sensor 112 and at least position sensors 16-1, 16-2, and 16-3. At operation 130, device 10 may monitor for conditions indicating that position information should be gathered using position sensors 16 and optical bridge sensor 112. In some scenarios, position sensors 16 and/or optical bridge sensor 112 may be used continuously (e.g., position measurements may be made repeatedly). In other situations, position sensors 16 and/or optical bridge sensor 112 may be inactive until predetermined trigger conditions are detected, at which point the sensors may be powered up and used to make measurements. This approach may help reduce power consumption by allowing position sensors 16 and/or optical bridge sensor 112 to be used only when position data is needed.

Device 10 may, as an example, use an input device such as a touch sensor, microphone, button, or other input device to gather user input from a user (e.g., a user input command indicating that position sensors 16 should gather position measurements and/or that optical bridge sensor 112 should gather optical bridge sensor data so that the optical alignment can be measured and corrected). As another example, an accelerometer, force sensor, or other sensor may be used to detect when devices 10 have been subjected to a drop event or other event that imparts stress to device components (e.g., excessive stress that might cause component misalignment). Devices 10 can also use internal clocks in their control circuitry to measure the current time (e.g., to determine whether a predetermined time for making position sensor measurements has been reached). If desired, operation 130 may be used to detect other conditions for triggering position sensor measurements and/or optical bridge sensor measurements (e.g., detecting when devices 10 have been placed within a storage case or have been removed from a storage case, detecting when device 10 is being powered on or powered off, detecting when wireless commands from another device 10 and/or remote equipment have been received, etc.). These criteria and/or other suitable position sensor measurement criteria may be used to determine when position measurements and/or optical bridge sensor image data should be gathered.

In response to detecting a condition indicating that position measurements and/or optical bridge sensor image data should be gathered, processing may proceed to operation 132. At operation 132, position sensors 16-1, 16-2, and 16-3 may gather position measurements (e.g., may gather position sensor data) and/or optical bridge sensor 112 may gather optical bridge sensor data from image light 38A and 38B. If desired, optical bridge sensor image data measurements may be made periodically (e.g., every X seconds, where X is less than 1 s, 0.5 s, at least 1 s, at least 10 s, at least 100 s, less than 500 s, less than 50 s, less than 5 s, or other suitable time period). Additionally or alternatively, if desired, position measurements may be made periodically (e.g., every Y seconds, where Y is at least 1 s, at least 10 s, at least 100 s, or other periods longer than X). Additional position sensors may gather position measurements of one or more infrared emitters and/or one or more infrared image sensors for calibrating gaze tracking if desired.

At operation 134, device 10 may adjust (e.g., correct, calibrate, alter, etc.) optical alignment between first projector 22B, second projector 22A, first waveguide 24B, and/or second waveguide 24A based on the position measurements and/or the optical bridge sensor image data. The adjustments may include adjustments to the image data displayed at first eye box 20B using the image light 38B produced by first projector 22B and/or adjustments to the image data displayed at second eye box 20A using the image light 38A produced by second projector 22A (e.g., image warping, geometric transforms, image distortion, image translations, etc.) and/or may include mechanical adjustments to one or more of first projector 22B, second projector 22A, first waveguide 24B, and/or second waveguide 24A. For example, in response to determining that binocular misalignment and/or real-world object registration is misoriented with respect to one or both of the displays leading to undesired image warping, the control circuitry of a device may be used to apply a geometric transform to the images being output by the display. The geometric transform may create an equal and opposite amount of image warping, so that the images viewed in the eye boxes are free from misalignment-induced distortion.

As an example, device 10 may calibrate (e.g., correct, compensate, mitigate, etc.) in-field drift between the left and right displays based on the optical bridge sensor image data (e.g., since the optical bridge sensor data is a real-time measure of the image light provided to the eye box by the left and right projectors and is thereby indicative of binocular misalignment). Device 10 may additionally or alternatively register virtual objects in the image data to real-world objects captured using at least OFCs 58-1 and 58-2 based on the optical bridge sensor data and the position measurements gathered using position sensors 16-1, 16-2, and 16-3. Position sensors 16-1, 16-2, and 16-3 may, for example, be used to identify the relative orientation between OFC 58-1 and optical bridge sensor 112, the relative orientation between OFC 58-2 and optical bridge sensor 112, and the relative orientation between OFCs 58-1 and 58-2. As the optical bridge sensor image data measures where virtual objects are presented at the eye boxes relative to their nominal positions, these relative orientations may be used to determine any misalignment between virtual objects themselves and the corresponding real-world objects that the virtual objects are registered to (e.g., since OFCs 58-1 and 58-2 capture the real-world objects and create knowledge in device 10 of the location of the real-world objects within the field of view).

If desired, additional optical alignment calibrations may be performed using the optical bridge sensor data, the position measurements, and/or any other desired sensor data (e.g., using the calibration of left-right binocular alignment (in-field drift) and real-world object registration (relative orientation between OFC 58-1, OFC 58-2, and optical bridge sensor 112) as a baseline calibration). If desired, position measurements of one or more infrared emitters and/or one or more infrared image sensors may be used to adjust and calibrate optical alignment used in gaze tracking operations.

During operation of device 10 by an end user (e.g., in the field), forces may be applied to optical bridge sensor 112 (FIG. 7) that undesirably affect measurements and calibrations performed using optical bridge sensor 112. For example, some portions of sensor housing 110 may bend with respect to other portions of sensor housing 110. These bending forces can be particularly pronounced because the optical bridge sensor is located in nose bridge NB of main portion 18M of the housing for the device, which can be subject to strain whenever the user places device 10 on their head. Such bending may, for example, misalign first image sensor 114A with respect to second image sensor 114 over time (e.g., one of the image sensors may degrade during operation by an end user adding additional error to the system). To mitigate these issues, optical bridge sensor 112 may be provided with a single image sensor that receives both image light 38A and image light 38B via dedicated bridge sensor optics that are in a first reference frame that is different from the reference from of waveguides 24A and 24B.

Figure 9:
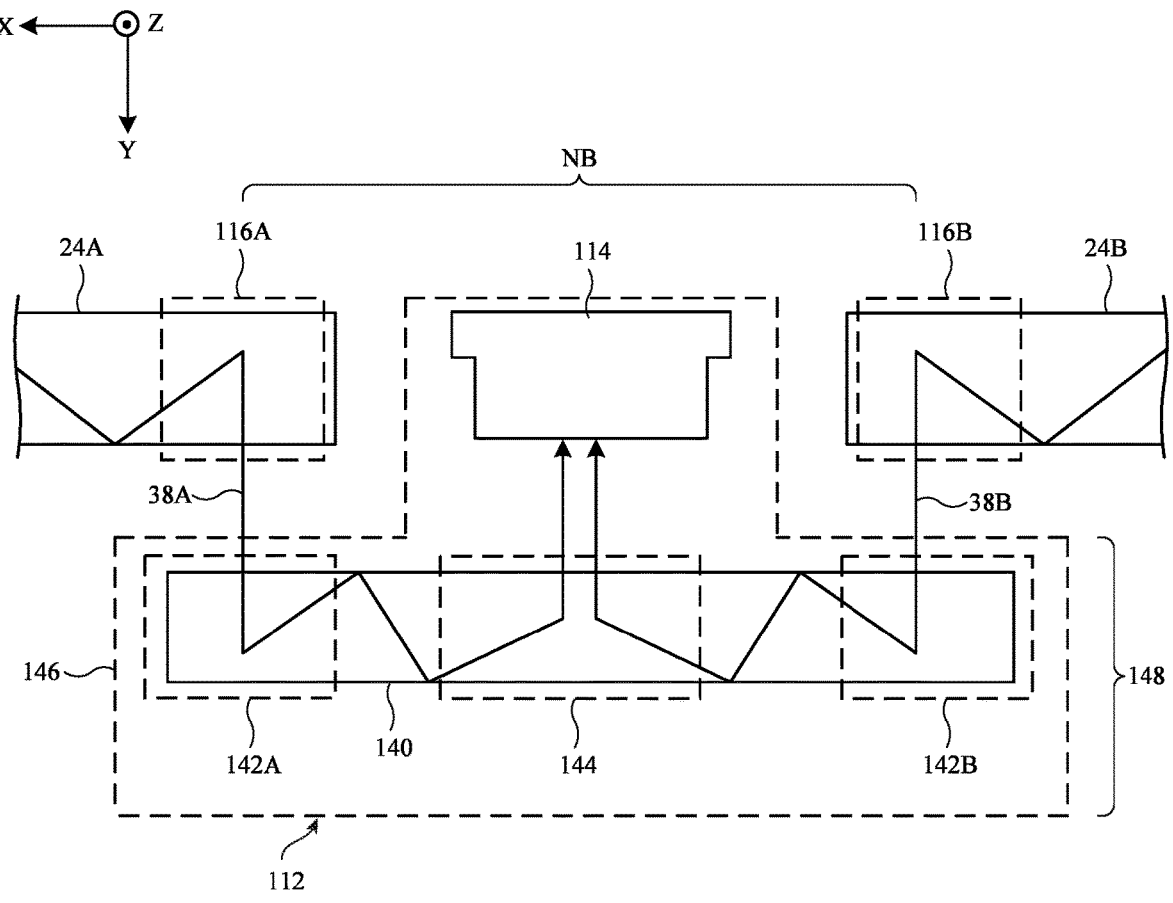
FIG. 9 is a cross-sectional top view of an optical bridge sensor having a single image sensor and a dedicated waveguide for directing image light to the single optical sensor in accordance with some embodiments.

FIG. 9 is a cross-sectional top view showing one example of how optical bridge sensor 112 may include a single image sensor that receives both image light 38A and image light 38B via optical bridge sensor optics. As shown in FIG. 9, optical bridge sensor 112 may include a single optical sensor 114 (e.g., a single image sensor or array of image sensor pixels). Optical bridge sensor 112 may also include bridge sensor optics 148. Optical sensor 114 may, for example, be disposed (interposed) between waveguides 24A and 24B. Bridge sensor optics 148 may be disposed at or facing a world-side of waveguides 24A and 24B, for example. Optical bridge sensor 112 of FIG. 9 may, for example, occupy less volume in device 10 than in the arrangement of FIG. 7.

Output coupler 116A on waveguide 24A may couple image light 38A out of waveguide 24A and towards bridge sensor optics 148. Output coupler 116B on waveguide 24B may couple image light 38B out of waveguide 24B and towards bridge sensor optics 148. Bridge sensor optics 148 may direct image light 38A and image light 38B towards optical sensor 114 (e.g., within a single field of view or two respective fields of view on the imaging surface of optical sensor 114). Optical sensor 114 may gather optical bridge sensor data in response to image light 38A and 38B.

Optical sensor 114 and bridge sensor optics 148 may be disposed within nose bridge NB of the housing 18 of device 10. Waveguides 24A and 24B may be mounted to housing 18 within a first reference frame. Optical sensor 114 and bridge sensor optics 148 may be mounted to housing 18 (e.g., using a mounting bracket, frame, or other structures) within a second reference frame 146. Any forces or bending applied to reference frame 146 will therefore produce uniform effects in the image light from the left waveguide and the image light from the right waveguide as imaged by optical sensor 114. Similarly, any bending or rotation of optical sensor 114 with respect to bridge sensor optics 148 will produce uniform effects in the image light from the left waveguide and the image light from the right waveguide as imaged by optical sensor 114. In other words, any bending or forces applied to nose bridge NB of the housing may produce uniform error for the image light received by the optical bridge sensor from both the left and right waveguides (e.g., without introducing variation between the left image light and the right image light that can be difficult or impossible to calibrate out). However, the uniform error may be easily calibrated out of the optical bridge sensor data (e.g., for use in performing the operations of FIG. 8).

Bridge sensor optics 148 may include any desired optical components such as one or more lenses, prisms, optical wedges, beam splitters, polarizers, polarizing beam splitters, waveplates, waveguides, optical couplers, diffractive gratings (e.g., one or more volume holograms or surface relief gratings), mirrors, reflectors, masking layers, etc. for redirecting image light 38A and 38B towards optical sensor 114. One or more position sensors 16 (FIG. 7) may be mounted to optical sensor 114 and/or optical bridge sensor optics 148.

In the example of FIG. 9, bridge sensor optics 148 include a dedicated optical bridge sensor waveguide such as waveguide 140. Waveguide 140 may at least partially overlap optical sensor 114, waveguide 24A, and/or waveguide 24B. For example, waveguide 140 may have a first end that overlaps waveguide 24A and an opposing second end that overlaps waveguide 24B. Waveguide 140 may be spaced apart (separated) from waveguides 24A and 24B or may be mounted to waveguides 24A and 24B. Waveguide 140 may be spaced apart (separated) from optical sensor 114 or may be mounted to optical sensor 114.

Waveguide 140 may include one or more input couplers 142 such as a first input coupler 142A and a second input coupler 142B. Waveguide 140 may also include one or more output couplers such as output coupler 144. Input coupler 142A may be disposed (mounted) at, on, within, and/or overlapping the first end of waveguide 24A (e.g., input coupler 142A may overlap waveguide 24A). Input coupler 142B may be disposed (mounted) at, on, within, and/or overlapping the second end of waveguide 24B (e.g., input coupler 142B may overlap waveguide 24B). Output coupler 144 may be disposed (mounted) at, on, within, and/or overlapping optical sensor 114. Output coupler 114 may therefore be (laterally) disposed (interposed) on waveguide 144 between input coupler 142A and input coupler 142B.

Output coupler 116A on waveguide 24A may direct image light 38A towards input coupler 142A on waveguide 140. Input coupler 142A may couple image light 38A into waveguide 32 (e.g., at an output angle within the total internal reflection (TIR) range of waveguide 140) and may direct image light 38A towards output coupler 144. Image light 38A may propagate along waveguide 140 towards output coupler 144 via TIR.

Output coupler 116B on waveguide 24B may direct image light 38B towards input coupler 142B on waveguide 140. Input coupler 142B may couple image light 38B into waveguide 32 (e.g., at an output angle within the total internal reflection (TIR) range of waveguide 140) and may direct image light 38B towards output coupler 144 (e.g., in propagation direction opposite the direction with which input coupler 142A directs image light 38A). Image light 38B may propagate along waveguide 140 towards output coupler 144 via TIR (e.g., in a direction opposite to the direction with which image light 38A propagates along waveguide 140 via TIR).

Output coupler 144 may receive image light 38A (e.g., at a first incident angle within the TIR range of waveguide 140) and may receive image light 38B (e.g., at a second incident angle within the TIR range of waveguide 140). Output coupler 144 may couple image light 38A out of waveguide 140 and may direct image light 38A towards optical sensor 114. Output coupler 144 may couple image light 38B out of waveguide 140 and may direct image light 38B towards optical sensor 114. Output coupler 144 may direct image light 38A and image light 38B onto the same field of view on optical sensor 114 (e.g., image light 38A and image light 38B may be superimposed/overlapping in the same field of view at optical sensor 114 to illuminate the same pixels of optical sensor 114). Alternatively, output coupler 144 may direct image light 38A and image light 38B onto different respective fields of view on optical sensor 114 (e.g., image light 38A and image light 38B may illuminate different pixels of optical sensor 114).

Input coupler 142A may include an input coupling prism (e.g., a reflective or transmissive input coupling prism), an angled edge or facet of waveguide 140, one or more partial reflectors or mirrors (e.g., a louvered mirror), a set of diffractive gratings (e.g., a set of volume holograms, a surface relief grating, etc.), or any other desired input coupling optics. Input coupler 142B may include an input coupling prism (e.g., a reflective or transmissive input coupling prism), an angled edge or facet of waveguide 140, one or more partial reflectors or mirrors (e.g., a louvered mirror), a set of diffractive gratings (e.g., a set of volume holograms, a surface relief grating, etc.), or any other desired input coupling optics. Output coupler 144 may include one or more output coupling prisms (e.g., a single output coupling prism that couples both image light 38A and 38B out of waveguide 140 or two output coupling prisms that couple image light 38A and 38B respectively out of waveguide 140), one or more angled edges or facets of waveguide 140, one or more partial reflectors or mirrors (e.g., one or more louvered mirrors, a first mirror that reflects image light 38A and a second mirror that reflects image light 38B, etc.), one or more sets of diffractive gratings, or any other desired output coupling optics.

In implementations where output coupler 144 includes diffractive gratings, output coupler 144 may, for example, include a first set of volume holograms that diffracts image light 38A towards optical sensor 114 and a second set of volume holograms that diffracts image light 38B towards optical sensor 114. The first and second sets of volume holograms may, if desired, be at least partially overlapping on waveguide 140. The first and second sets of volume holograms may, for example, be superimposed within the same volume of a grating medium on waveguide 140. In other examples, output coupler 144 may include a first SRG that diffracts image light 38A and a second SRG that diffracts image light 38B.

Waveguide 140 may include one or more waveguide substrates layered on the grating medium (e.g., where the grating medium is sandwiched between waveguide substrates). If desired, diffractive gratings in input coupler 142A, input coupler 142B, and/or output coupler 144 may all be disposed, embedded, etched, or recorded in the same layer of grating medium on waveguide 140. Alternatively, diffractive gratings in input coupler 142A, input coupler 142B, and/or output coupler 144 may be disposed, embedded, or recorded in different respective layers of grating media on waveguide 140.

Figure 10:
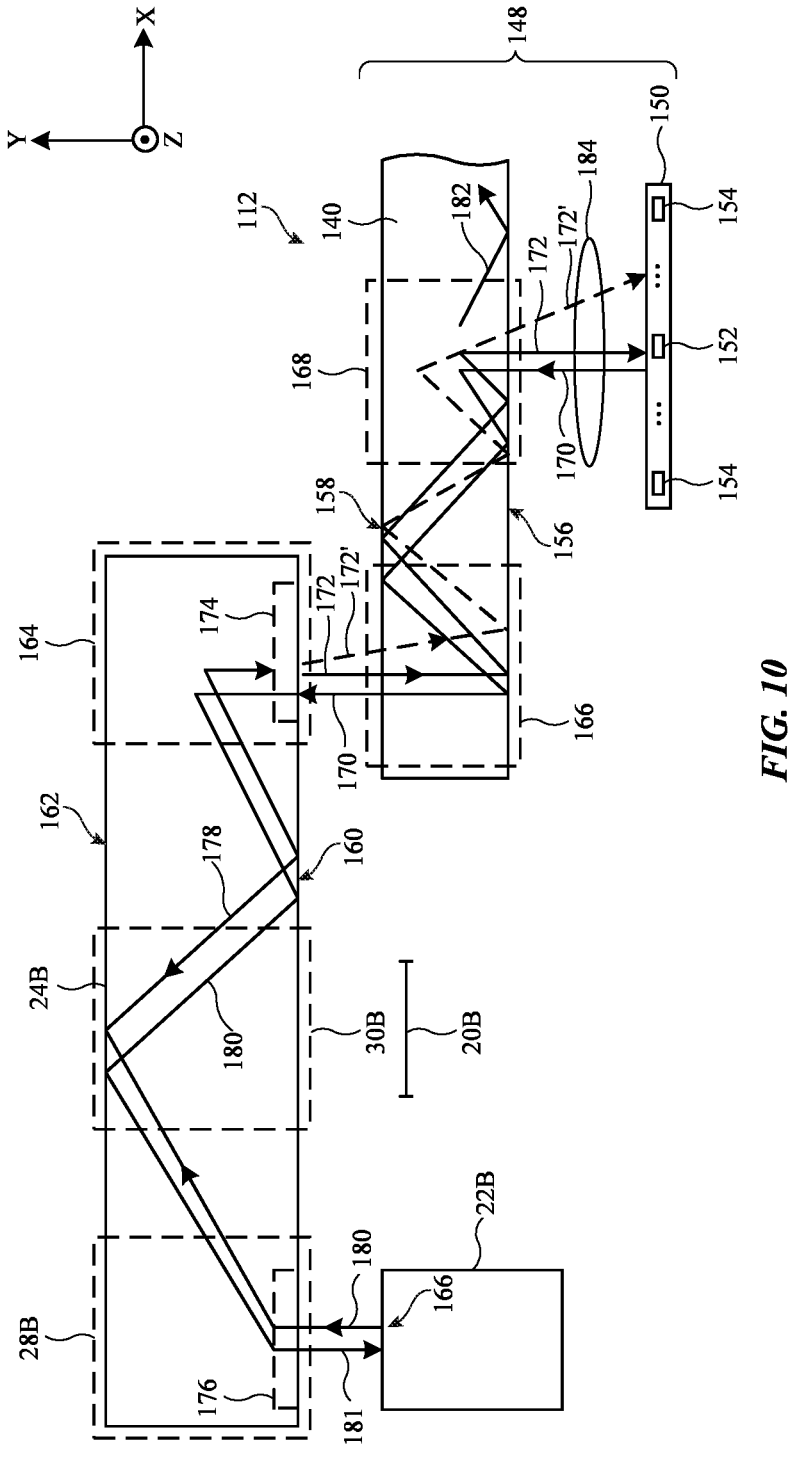
FIG. 10 is a cross-sectional top view of an optical bridge sensor having a dedicated waveguide, optical emitters, and optical sensors for calibrating optical alignment in accordance with some embodiments.

The example of FIGS. 5, 7, and 9 in which optical alignment calibration is performed using light produced by projectors 22 and sensed by optical bridge sensor 112 is illustrative and non-limiting. If desired, optical alignment calibration may be performed using light that is both emitted and sensed by bridge sensor 112. FIG. 10 is a top view showing one example of how optical bridge sensor 112 may both emit and sense light for performing optical alignment calibration (e.g., at operation 134 of FIG. 8). In the example of FIG. 10, waveguide 24A, projector 22A, position sensors 16, and the propagation of image light 30 have been omitted for the sake of clarity.

As shown in FIG. 10, bridge sensor optics 148 in optical bridge sensor 112 may include optical components 150 that are optically coupled to waveguide 140 (sometimes referred to herein simply as optics 150). Optical components 150 may include one or more optical emitters (light sources) such as optical emitters 152. Optical emitters 152 may emit light 170 (e.g., a pattern of light) for use in performing optical alignment calibration operations. Light 170 may sometimes be referred to herein as calibration light 170.

If desired, two or more optical emitters 152 may be arranged in an array pattern and each optical emitter 152 may emit light 170 at a different respective field angle. Optical emitters 152 may include light-emitting diodes, organic light-emitting diodes, lasers (e.g., vertical-cavity surface-emitting lasers (VCSELs)), or any other desired light sources. An implementation in which optical emitters 152 include VCSELs is described herein as an example (e.g., an array of VCSELs that each emits light 170 at a different respective field angle).

Optical components 150 may also include a set of two or more optical sensors such as optical sensors 154. Optical sensors 154 may include photodiodes, image sensors, image sensor pixels, cameras, or other light-sensitive elements that generate electrical signals in response to incident photons. Implementations in which optical sensors 154 each include a single photodiode are described herein as an example.

Optical sensors 154 may be distributed at different locations within optical components 150. This may, for example, allow each optical sensor 154 to sense light incident from different angles. If desired, optical sensors 154 and optical emitters 152 may be disposed on the same substrate (e.g., facing the same side of waveguide 140 such as lateral surface 156 of waveguide 140, as shown in the example of FIG. 10). In these implementations, optical sensors 154 may laterally surround optical emitters 152 or may otherwise be interspersed or interleaved with optical emitters 152 on the substrate.

In other implementations, optical components 150 may instead be mounted at the side of waveguide 140 facing waveguide 24B (e.g., at or adjacent to lateral surface 158 of waveguide 140, which opposes lateral surface 156). In further implementations, one or more optical emitters 152 may be located at a first side of waveguide 140 (e.g., facing lateral surface 158 or lateral surface 156) whereas one or more optical sensors 154 are located at the opposing side of waveguide 140 (e.g., facing lateral surface 156 or lateral surface 158). If desired, optical emitters 152 and/or optical sensors 154 may be located at, facing, or along both sides of waveguide 140. If desired, bridge sensor optics 148 may also include one or more lenses such as lens 184 (e.g., one or more lens elements) optically coupled between optical components 150 and waveguide 140.

When performing in-field optical alignment calibration operations (e.g., while processing operation 134 of FIG. 8), optical emitter(s) 152 may emit light 170 towards waveguide 140 (e.g., at one or more field angles). Light 170 may include any desired wavelengths (e.g., visible wavelengths, infrared wavelengths, near-infrared wavelengths, etc.). Lens 184 may help to direct light 170 towards an optical coupler 168 on waveguide 140. Optical coupler 168 may include one or more diffractive optical elements (DOEs) (e.g., surface relief gratings, volume holograms, metagratings, etc.), one or more partial reflectors, one or more mirrors, one or more beam splitters, one or more polarizing beam splitters, one or more reflective polarizers, one or more polarizers, one or more phase retarders, one or more prisms, one or more angled faces of waveguide 140, a louvered mirror, one or more lenses, and/or any other desired optics that couple light 170 into waveguide 140 (e.g., within the TIR range of waveguide 140). If desired, optical coupler 168 may also direct some of light 170 towards waveguide 24A (FIGS. 5, 7, and 10), as shown by arrow 182. While only the propagation of light 170 through waveguide 140 and waveguide 24B are shown in FIG. 10 for the sake of clarity, the structures of FIG. 10 and the operations of light 170 may also be mirrored for waveguide 24A on the opposing side of the system (e.g., using the portion of light 170 shown by arrow 182).

Waveguide 140 may include an additional optical coupler such as optical coupler 166 at the end of waveguide 140 at or overlapping waveguide 24B. Optical coupler 166 may include one or more diffractive optical elements (DOEs) (e.g., surface relief gratings, volume holograms, metagratings, etc.), one or more partial reflectors or mirrors, one or more beam splitters, one or more coupling prisms, one or more angled faces of waveguide 140, a louvered mirror, one or more lenses, or any other desired optics that couple light into and/or out of waveguide 140. In one implementation that is described herein as an example, optical coupler 166 may include one or more diffractive gratings (e.g., one or more silicon nitride (SiN) gratings) located at or on lateral surface 156 or lateral surface 158 of waveguide 140.

Light 170 may propagate along waveguide 140 towards optical coupler 166. Optical coupler 166 may couple light 170 out of waveguide 140 and towards lateral surface 160 of waveguide 24B. Waveguide 24B may include an additional optical coupler such as optical coupler 164 at the end of waveguide 24B at or overlapping waveguide 140 (e.g., optical coupler 164 may replace optical coupler 116B of FIGS. 7 and 9). Optical coupler 164 may include one or more diffractive optical elements (DOEs) (e.g., surface relief gratings, volume holograms, metagratings, etc.), one or more partial reflectors or mirrors, one or more beam splitters, one or more coupling prisms, one or more angled faces of waveguide 24B, a louvered mirror, one or more lenses, or any other desired optics that couple light into and/or out of waveguide 24B.

In one implementation that is described herein as an example, optical coupler 166 may include a partial reflector 174 located at or on (e.g., layered on) lateral surface 160 of waveguide 24B. Partial reflector 174 may be formed from one or more diffractive gratings, for example. Partial reflector 174 may be non-overlapping with respect to output coupler 30B. In other implementations, partial reflector 174 may be formed from one or more metallic and/or dielectric coatings or films. Partial reflector 174 may reflect a first portion of light 170 (e.g., via Fresnel reflection) away from waveguide 24B while also transmitting a second portion of light 170 into waveguide 24B. In other implementations, partial reflector 174 may reflect substantially all of light 170 (e.g., partial reflector 174 may effectively form a total reflector for light 170).

As shown in FIG. 10, partial reflector 174 may reflect the first portion of light 170 incident from waveguide 140 back towards optical coupler 166 on waveguide 140 (as reflected light 172, which is sometimes referred to herein as reflected calibration light 172). Optical coupler 166 may couple reflected light 172 into waveguide 140 and towards optical coupler 168 (e.g., within the TIR range of waveguide 140).

In this way, optical coupler 166 may form both an output coupler on waveguide 140 for light 170 and an input coupler on waveguide 140 for reflected light 172 (e.g., optical coupler 166 may include a single grating or multiple different sets of overlapping gratings that diffract light 170 and reflected light 172 in different respective directions).

Waveguide 140 may propagate reflected light 172 towards optical coupler 168. Optical coupler 168 may couple reflected light 172 out of waveguide 140 and towards optical components 150. In this way, optical coupler 168 may form both an input coupler on waveguide 140 for light 170 and an output coupler on waveguide 140 for reflected light 172. If desired, lens 184 may help to direct or focus reflected light 172 onto optical components 150. Optical sensors 154 may generate electrical signals (optical sensor data) in response to the incident reflected light 172. Optical sensors 154 may pass the electrical signals to control circuitry for performing subsequent optical alignment calibration operations (e.g., to identify and correct for optical misalignment of the system).

Lateral surface 160 of waveguide 24B may be parallel to lateral surface 162 of waveguide 24B. Lateral surface 158 of waveguide 140 may be parallel to lateral surface 156 of waveguide 140. When the system exhibits ideal optical alignment (e.g., prior to a drop event, impact event, or other misalignment event), waveguide 24B and thus lateral surfaces 162 and 160 are oriented at a first predetermined and fixed angle with respect to waveguide 140 and thus lateral surfaces 158 and 156, at a second predetermined and fixed angle with respect to waveguide 24A on the opposing side of the system (not shown), at a third predetermined and fixed angle with respect to the optical face 166 of projector 22B (e.g., the face of projector 22B through which projector 22B emits image light), and at a fourth predetermined and fixed angle with respect to the optical face of projector 22A on the opposing side of the system (not shown). In one example, as shown in the illustrative arrangement of FIG. 10, the first and third angles are zero degrees (e.g., lateral surface 162, lateral surface 160, lateral surface 158, lateral surface 156, and optical face 166 may be parallel). Other default angular relationships may be used in practice.

When waveguide 24B and waveguide 140 exhibit ideal optical alignment, the reflected light 172 from partial reflector 174 is guided, by waveguide 140 and lens 184, onto a first portion of optical components 150 (e.g., within a beam overlapping a first portion of one or more optical sensors 154 in optical components 150). However, when waveguide 24B and waveguide 140 exhibit non-ideal optical alignment (e.g., after a drop event, impact event, or other event causing the misalignment, tilting, or rotation of waveguide 24B relative to waveguide 140 from the ideal optical alignment), the reflected light 172 from partial reflector 174 will be incident upon waveguide 140 at a slightly different angle than when waveguide 24B and waveguide 140 exhibit ideal optical alignment, which may cause the reflected light 172 to be incident upon a second portion of optical components 150 after propagating through waveguide 140 and lens 184, as shown by arrow 172' (e.g., within a beam overlapping a second portion of one or more optical sensors 154 in optical components 150). As such, different optical sensors 154 (e.g., at different positions within optical components 150) will produce different magnitudes of optical sensor data depending on the relative orientation of waveguide 24B with respect to waveguide 140.

The control circuitry may identify the optical alignment between waveguide 24B and waveguide 140 (e.g., the relative tilt/tip angle(s) between waveguide 24B and waveguide 140) based on the optical sensor data generated by optical sensors 154 (e.g., based on which optical sensor positions were illuminated by different amounts of the reflected light 172). In other words, the control circuitry may map the optical sensor data to the relative angle between waveguide 24B and waveguide 140. By repeating this process for the waveguide 24A on the opposing side of the system (not shown) using the portion of light 170 shown by arrow 182, the control circuitry may then identify the relative angle between waveguide 24A and waveguide 140 and thus the relative angle between waveguide 24A and waveguide 24B (e.g., for performing the optical alignment calibration operations of step 134 of FIG. 8).

As shown in FIG. 10, if desired, partial reflector 174 on waveguide 24B may also couple a second portion of light 170 into waveguide 24B (e.g., within the TIR range of waveguide 24B), as shown by arrow 178. Waveguide 24B may propagate the second portion of light 170 towards the opposing end of waveguide 24B that overlaps projector 22B. If desired, an additional optical coupler 176 may be disposed on waveguide 24B at this end (e.g., overlapping projector 22B). Optical coupler 176 may include one or more diffractive optical elements (DOEs) (e.g., surface relief gratings, volume holograms, metagratings, etc.), one or more partial reflectors or mirrors, one or more beam splitters, one or more coupling prisms, one or more angled faces of waveguide 24B, a louvered mirror, one or more lenses, or any other desired optics that couple the second portion of light 170 out of and/or into waveguide 24B.

In one implementation that is described herein as an example, optical coupler 176 may include a partial reflector located at or on (e.g., layered on) lateral surface 160 of waveguide 24B. Optical coupler 176 may therefore sometimes be referred to herein as partial reflector 176. Partial reflector 176 may be formed from one or more diffractive gratings, for example. Partial reflector 176 may transmit some of the second portion of light 170 towards optical face 166 of projector 22B, as shown by arrow 181, which then reflects off optical face 166 and back towards waveguide 24B, as shown by arrow 180. Input coupler 28B and/or partial reflector 176 may direct this reflected light back towards optical coupler 164 (e.g., within the TIR range of waveguide 24B), as shown by arrow 180.

Additionally or alternatively, partial reflector 176 may reflect some of the second portion of the light 170 incident from the direction of arrow 178 back towards optical coupler 164 (e.g., within the TIR range of waveguide 24B), as also illustrated by arrow 180. Optical coupler 164 may then couple this reflected light (e.g., reflected light from partial reflector 176 and/or optical face 166 of projector 22B, as illustrated by arrow 180) out of waveguide 24B and towards optical coupler 166 on waveguide 140. The propagation of the reflected light associated with arrow 180 beyond optical coupler 164 is not illustrated in FIG. 10 so as to not unnecessarily obscure the drawings. Optical coupler 166 may then couple the reflected light illustrated by arrow 180 into waveguide 140 (e.g., within the TIR range of waveguide 140) and towards optical coupler 168, which couples the reflected light out of waveguide 140 and towards optical components 150. If desired, lens 184 may help to direct or focus this reflected light onto optical components 150. Optical sensors 154 may generate electrical signals (optical sensor data) in response to this incident reflected light.

The control circuitry may perform similar operations on this optical image sensor data as performed on reflected light 172 to identify the relative rotation of waveguide 24B relative to waveguide 140 (e.g., using phase associated with the light reflected off partial reflector 176) and/or to identify the relative angle between projector 22B (e.g., optical face 166) and waveguide 24B (e.g., lateral surfaces 160 and 162) and thus between projector 22B and waveguide 140 (e.g., using the light reflected off projector 22B). In other words, the control circuitry may identify the optical alignment between projector 22B, waveguide 24B, and waveguide 140 (e.g., the relative angle(s) between projector 22B and waveguide 24B and/or waveguide 140) based on the optical sensor data generated by optical sensors 154 from the reflected light associated with arrow 180 (e.g., based on which optical sensor positions were illuminated by different amounts of the reflected light associated with arrow 180). By repeating this process for the waveguide 24A and projector 22A on the opposing side of the system (not shown) using the portion of light 170 shown by arrow 182, the control circuitry may then identify the relative angles between projector 22A, projector 22B, waveguide 24A, and/or waveguide 24B (e.g., for performing the optical alignment calibration operations of step 134 of FIG. 8).

In general, any desired temporal or spatial multiplexing techniques may be used to allow optical sensors 154 to distinguish between reflected light received from partial reflector 174, partial reflector 176, and waveguide 24A or projector 22A on the opposing side of the system (not shown). For example, different sets of optical emitters 152 may be used to generate light 170 conveyed to waveguide 24A and waveguide 24B (e.g., using one or two different optical couplers 168 on waveguide 140), different sets of optical sensors 154 may be used to receive reflected light from waveguide 24A and waveguide 24B (e.g., using one or two different optical couplers 168 on waveguide 140), optical coupler 164, optical coupler 166, and/or optical coupler 168 may direct reflected light towards optical coupler 168 within different respective angular ranges depending on whether the reflected light is reflected light 172 or the reflected light associated with arrow 180, optical coupler 166, optical coupler 168, and/or the optical coupler 166 used for the waveguide 24A on the opposing side of the system (not shown) may direct reflected light towards optical coupler 168 within different respective angular ranges depending on whether the reflected light is from waveguide 24A or waveguide 24B, light 170 may be provided to waveguide 24A or waveguide 24B at different respective times (e.g., using the same optical emitters 152 or different optical emitters 152), switchable gratings or beam splitters may be used to implement one or more of the optical couplers, and/or any other desired operations may be performed to allow the control circuitry to distinguish the source of the reflected light in the optical sensor data generated by optical sensors 154.

Figure 11:
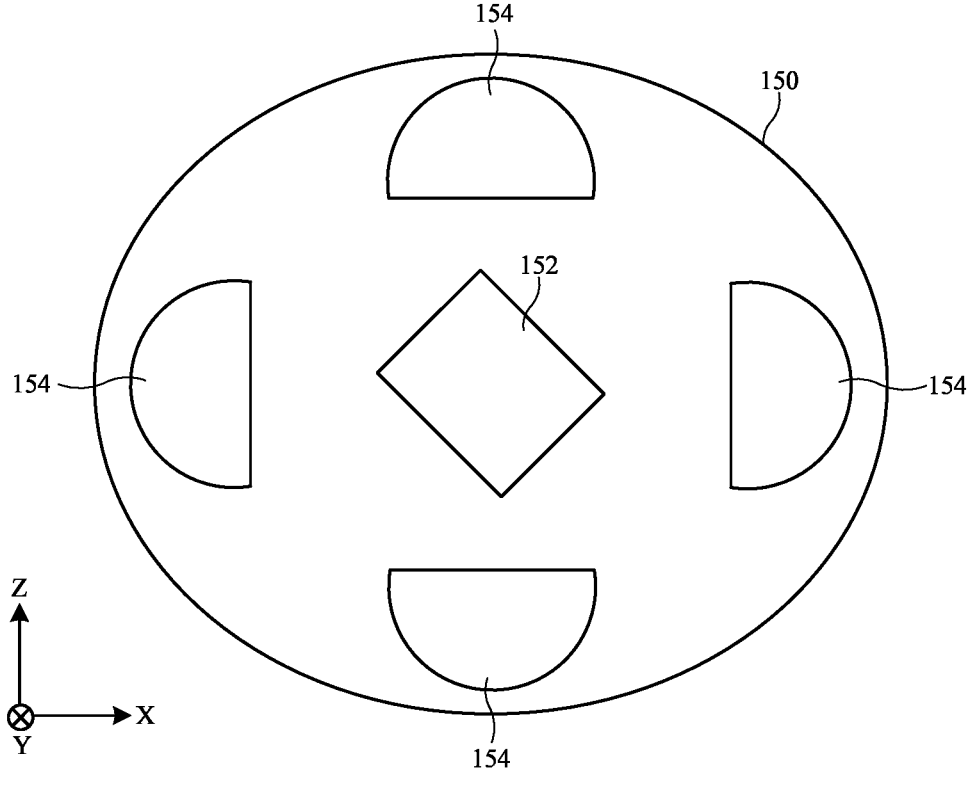
FIG. 11 is a front view of illustrative optical emitters and optical sensors in an optical bridge sensor of the type shown in FIG. 10 in accordance with some embodiments.

FIG. 11 is a top view showing one illustrative example of optical components 150 that may be used to generate light 170 and to receive reflected light for use in performing optical alignment calibration. As shown in FIG. 11, optical components 150 may include at least four optical sensors 154 (e.g., photodiodes) distributed at different locations around one or more optical emitters 152 (e.g., VCSELs). The example of FIG. 11 is illustrative and non-limiting and, in general, optical components 150 may include any desired number of optical sensors 154. Optical sensors 154 and optical emitter(s) 152 may be arranged in any desired patterns and may have any desired shapes.

Different optical sensors 154 may receive different amounts of reflected light depending on the optical alignment between waveguide 24A, waveguide 24B, waveguide 140, projector 22A, and/or projector 22B. For example, when reflected light 172 (FIG. 10) is incident upon optical components 150 under ideal optical alignment conditions, reflected light 172 may illuminate a first portion of a first set of optical sensors 154 such that the optical sensors 154 generate a first set of optical sensor data (e.g., each optical sensor 154 may receive an equal amount of reflected light 172 such that each optical sensor 154 generates respective optical sensor data having the same magnitude).

However, when waveguide 24B is tilted at a non-ideal angle with respect to waveguide 140, reflected light 172 may illuminate a second portion of a second set of optical sensors 154 (e.g., as shown by arrow 172' of FIG. 1) such that the optical sensors 154 generate a second set of optical sensor data (e.g., one or more of the optical sensors such as the right-most optical sensor 154 in FIG. 11 may generate optical sensor data having a greater magnitude than the other optical sensors 154). By comparing the relative magnitude of the optical sensor data generated by each of the optical sensors 154 (and comparing the optical sensor data to predetermined optical sensor data under ideal optical alignment conditions), the control circuitry may identify where the reflected light is incident upon optical components 150. The control circuitry may then determine the tilt angle of waveguide 24B relative to waveguide 140 based on the position of the reflected light on optical components 150 and the known geometry of the system (e.g., based on the change in the position of the reflected light from what would be expected under ideal optical alignment) and may use the tilt angle to perform subsequent optical alignment calibration operations. In this way, the control circuitry may map the optical sensor data (e.g., via the known locations of the optical sensors 154) to alignment angles between the components of the system. Similar operations may be performed to identify the relative angles between projector 22B, waveguide 24B, waveguide 140, waveguide 24A, and/or projector 22A.

If desired, the sensitivity of optical sensors 154 may be further increased by utilizing Fresnel reflections from the interface between waveguides 24B and 140 (e.g., at the location of partial reflector 174 of FIG. 10) to form an optical local oscillator (e.g., by picking off the local oscillator (LO) signal from the light emitted by optical emitter(s) 152 and using the LO signal to measure the tip and tilt of the display). For example, the control circuitry may perform a frequency sweep of optical emitter(s) 152 (e.g., one or more VCSELs) using a current driver, and the overlap of the reflected light from the primary (display) waveguide 24B with the LO signal produces a beat signal, which may be detected by the optical sensors (e.g., the control circuitry may detect optical alignment/misalignment based on the beat signal). This may serve to increase the sensitivity of the optical sensor for detecting tipping and tilting between two or more optical components of the display. Furthermore, the control circuitry may, if desired, use the optical sensors to detect in-plane rotation by processing the phase of the return light from the final reflector at the far end of the display waveguide 24B (e.g., at optical coupler 176).

The foregoing is merely illustrative and various modifications can be made to the described embodiments. The foregoing embodiments may be implemented individually or in any combination.

What is claimed is:

1. An electronic device comprising:
 a projector configured to generate first light;
 a first waveguide having a first optical coupler configured to couple the first light into the first waveguide and having a second optical coupler configured to couple the first light out of the first waveguide;

a second waveguide having a third optical coupler;

a light source configured to emit second light into the second waveguide, wherein the third optical coupler is configured to couple the second light out of the second waveguide;

a partial reflector on the first waveguide and overlapping the second waveguide, wherein the partial reflector is configured to reflect the second light as reflected light, the third optical coupler being configured to couple the reflected light into the waveguide; and an optical sensor configured to receive the reflected light through the second waveguide and configured to generate optical sensor data based on the reflected light.

2. The electronic device of claim 1, wherein the projector is configured to produce images in the first light.

3. The electronic device of claim 1, wherein the light source comprises a vertical-cavity surface-emitting laser (VCSEL).

4. The electronic device of claim 3, wherein the optical sensor comprises a plurality of photodiodes.

5. The electronic device of claim 4, wherein the plurality of photodiodes laterally surrounds the VCSEL.

6. The electronic device of claim 1, wherein the partial reflector comprises a diffractive grating.

7. The electronic device of claim 6, wherein the third optical coupler comprises an additional diffractive grating.

8. The electronic device of claim 6, wherein the first waveguide has a first lateral surface facing the projector and the second waveguide and has a second lateral surface opposite the first lateral surface, the diffractive grating being layered onto the first lateral surface.

9. The electronic device of claim 1, further comprising:

an additional projector configured to generate third light;

a third waveguide having a fourth optical coupler configured to couple the third light into the third waveguide and having a fifth optical coupler configured to couple the third light out of the third waveguide;

a beam splitter on the second waveguide and configured to direct a portion of the second light towards the third waveguide; and a sixth optical coupler on the second waveguide and configured to couple the portion of the second light out of the second waveguide and towards the third waveguide.

10. The electronic device of claim 9, further comprising: one or more processors configured to identify a misalignment between the first and third waveguides based on the optical sensor data.

11. The electronic device of claim 1, wherein the partial reflector is non-overlapping with respect to the second optical coupler.

12. The electronic device of claim 1, further comprising:

an additional partial reflector on the first waveguide and overlapping the projector, wherein the partial reflector is configured to transmit a portion of the second light into the waveguide and the additional partial reflector is configured to reflect at least some of the portion of the second light back towards the partial reflector.

13. The electronic device of claim 1, further comprising:

a lens configured to transmit the second light from the light source towards the second waveguide and configured to transmit the reflected light from the second waveguide towards the optical sensor.

14. An electronic device comprising:

a projector configured to generate first light;

a first waveguide having a first optical coupler configured to couple the first light into the first waveguide, having a second optical coupler configured to couple the first light out of the first waveguide, having a partial reflector overlapping the projector and the first optical coupler, and having a third optical coupler;

a second waveguide having a fourth optical coupler;

a light source configured to emit second light into the second waveguide, wherein the fourth optical coupler is configured to couple the second light out of the second waveguide and towards the first waveguide, the third optical coupler is configured to couple a portion of the second light into the waveguide, the partial reflector is configured redirect the portion of the second light back towards the third optical coupler as reflected light, the third optical coupler is configured to couple the reflected light out of the first waveguide and towards the second waveguide, and the fourth optical coupler is configured to couple the reflected light into the second waveguide; and an optical sensor configured to receive the reflected light through the second waveguide and configured to generate optical sensor data based on the reflected light.

15. The electronic device of claim 14, wherein the partial reflector is non-overlapping with respect to the second and third optical couplers.

16. The electronic device of claim 14, wherein the partial reflector comprises a diffractive grating.

17. The electronic device of claim 14, wherein the partial reflector is configured to:

transmit at least some of the portion of the second light towards the projector, receive the at least some of the portion the second light after reflection off the projector, and transmit the at least some of the portion of the second light towards the third optical coupler.

18. The electronic device of claim 14, wherein the projector is configured to produce images in the first light, the light source comprises a vertical-cavity surface-emitting laser (VCSEL), and the optical sensor comprises a plurality of photodiodes.

19. The electronic device of claim 14, wherein the third optical coupler comprises an additional partial reflector, the additional partial reflector being configured to reflect an additional portion of the second light back towards the fourth optical coupler.

20. An electronic device comprising:

a first waveguide configured to propagate first light;

a first optical coupler on the first waveguide and configured to couple the first light out of the first waveguide;

a second waveguide;

one or more vertical-cavity surface-emitting lasers (VCSELs) configured to emit second light;

a second optical coupler on the second waveguide and configured to couple the second light into the second waveguide;

a third optical coupler on the second waveguide and configured to couple the second light out of the waveguide and towards the first waveguide;

a fourth optical coupler on the first waveguide and overlapping the second waveguide, wherein the fourth optical coupler is configured to reflect at least some of the second light back towards the third optical coupler as reflected light, the third optical coupler is configured to couple the reflected light into the second waveguide, and the second optical coupler is configured to couple the reflected light out of the waveguide; and an array of photodiodes configured to generate electrical signals based on the reflected light coupled out of the waveguide by the fourth optical coupler.

\* \* \* \* \*